(12) United States Patent
Goncalves et al.

(10) Patent No.: US 11,386,636 B2
(45) Date of Patent: Jul. 12, 2022

(54) IMAGE PREPROCESSING FOR OPTICAL CHARACTER RECOGNITION

(71) Applicant: Datalogic USA, Inc., Eugene, OR (US)

(72) Inventors: Luis Goncalves, Pasadena, CA (US); Filippo Mambelli, Pasadena, CA (US); Paolo Gentili, Falerone (IT)

(73) Assignee: Datalogic USA, Inc., Eugene, OR (US)

( * ) Notice: Subject to any disclaimer, the term of this patent is extended or adjusted under 35 U.S.C. 154(b) by 307 days.

(21) Appl. No.: 16/724,028

(22) Filed: Dec. 20, 2019

(65) Prior Publication Data

US 2020/0320324 A1 Oct. 8, 2020

Related U.S. Application Data

(60) Provisional application No. 62/829,451, filed on Apr. 4, 2019.

(51) Int. Cl.

| | |
|---|---|
| *G06V 10/22* | (2022.01) |
| *G06V 10/26* | (2022.01) |
| *G06V 10/50* | (2022.01) |
| *G06V 20/62* | (2022.01) |
| *G06V 30/10* | (2022.01) |
| *G06V 30/14* | (2022.01) |
| *G06V 30/18* | (2022.01) |
| *G06T 3/40* | (2006.01) |
| *G06T 3/60* | (2006.01) |
| *G06K 9/62* | (2022.01) |

(52) U.S. Cl.
CPC .......... *G06V 10/22* (2022.01); *G06K 9/6201* (2013.01); *G06K 9/6232* (2013.01); *G06T 3/40* (2013.01); *G06T 3/60* (2013.01); *G06V 10/26* (2022.01); *G06V 10/507* (2022.01); *G06V 20/63* (2022.01); *G06V 30/10* (2022.01)

(58) Field of Classification Search
None
See application file for complete search history.

(56) References Cited

U.S. PATENT DOCUMENTS

| | | |
|---|---|---|
| 5,497,314 A | 3/1996 | Novak |
| 5,513,277 A | 4/1996 | Huttenlocher |
| | (Continued) | |

FOREIGN PATENT DOCUMENTS

| | | | | |
|---|---|---|---|---|
| AU | 2015318702 B2 | 10/2019 | | |
| CN | 104933730 A | * | 9/2015 | ......... G06K 9/00369 |
| | (Continued) | | | |

OTHER PUBLICATIONS

Bissacco, A. et al., "PhotoOCR: Reading Text in Uncontrolled Conditions", Computer Vision Foundation, pp. 785-792, 2013.

(Continued)

*Primary Examiner* — Mohammed Rachedine
(74) *Attorney, Agent, or Firm* — Cozen O'Connor

(57) ABSTRACT

A captured image contains a region of interest (ROI) including a plurality of characters to be recognized as text, and non-ROI content to be excluded from the OCR. The captured image is preprocessed to detect and locate the ROI in the captured image, and to determine a boundary of the ROI, including transforming the captured image to a first feature descriptor representation (FDR), and performing a comparison between the first FDR and at least one ROI template that includes at least a second FDR of a representative ROI image. The preprocessing produces an output to be provided to an OCR engine to perform autonomous OCR processing of the ROI while ignoring the non-ROI content based on the determined boundary of the ROI.

20 Claims, 10 Drawing Sheets

(56) References Cited

U.S. PATENT DOCUMENTS

| | | |
|---|---|---|
| 5,513,304 A | 4/1996 | Spitz et al. |
| 5,710,833 A | 1/1998 | Moghaddam et al. |
| 5,745,600 A | 4/1998 | Chen et al. |
| 5,768,420 A | 6/1998 | Brown et al. |
| 6,050,731 A | 4/2000 | Matsui |
| 6,249,604 B1 | 6/2001 | Huttenlocher et al. |
| 6,711,293 B1 | 3/2004 | Lowe |
| 6,816,611 B1 | 11/2004 | Hagiwara et al. |
| 7,031,525 B2 | 4/2006 | Beardsley |
| 7,118,026 B2 | 10/2006 | Harris et al. |
| 7,422,147 B2 | 9/2008 | Rosenbaum |
| 7,519,201 B2 | 4/2009 | Yang et al. |
| 7,599,543 B2 | 10/2009 | Jones et al. |
| 7,602,956 B2 | 10/2009 | Jones et al. |
| 7,627,178 B2 | 12/2009 | Suzuki et al. |
| 7,643,683 B2 | 1/2010 | Miller |
| 7,689,321 B2 | 3/2010 | Karlsson |
| 8,033,470 B2 | 10/2011 | Maeda et al. |
| 8,196,822 B2 | 6/2012 | Goncalves |
| 8,218,850 B2 | 7/2012 | Raundahl et al. |
| 8,224,110 B2 | 7/2012 | Mishima et al. |
| 8,285,019 B2 | 10/2012 | Raundahl et al. |
| 8,306,318 B2 | 11/2012 | Cao et al. |
| 8,346,684 B2 | 1/2013 | Mirbach et al. |
| 8,353,457 B2 | 1/2013 | Olmstead |
| 8,363,939 B1 | 1/2013 | Khosla et al. |
| 8,379,912 B2 | 2/2013 | Yadid et al. |
| 8,385,593 B2 | 2/2013 | Urbach et al. |
| 8,396,278 B2 | 3/2013 | Jones et al. |
| 8,401,308 B2 | 3/2013 | Nakamura et al. |
| 8,429,103 B1 | 4/2013 | Aradhye et al. |
| 8,489,232 B2 | 7/2013 | Mishra et al. |
| 8,509,534 B2 | 8/2013 | Galic et al. |
| 8,509,537 B2 | 8/2013 | Perronnin et al. |
| 8,510,238 B1 | 8/2013 | Aradhye et al. |
| 8,515,136 B2 | 8/2013 | Mori et al. |
| 8,538,081 B2 | 9/2013 | Xiao et al. |
| 8,542,794 B2 | 9/2013 | Miyamoto |
| 8,542,926 B2 | 9/2013 | Panjwani et al. |
| 8,553,989 B1 | 10/2013 | Owechko et al. |
| 8,559,671 B2 | 10/2013 | Seo et al. |
| 8,774,510 B2 | 7/2014 | Xu et al. |
| 8,902,760 B2 | 12/2014 | Austermann et al. |
| 8,942,420 B2 | 1/2015 | Kim et al. |
| 9,111,173 B2 | 8/2015 | Ranganathan et al. |
| 9,239,943 B2 | 1/2016 | Svetal |
| 9,396,404 B2 | 7/2016 | Goncalves |
| 9,418,283 B1 | 8/2016 | Natarajan et al. |
| 9,466,009 B2 | 10/2016 | Jaber et al. |
| 9,530,067 B2 | 12/2016 | Ye |
| 9,639,951 B2 | 5/2017 | Salahat et al. |
| 9,754,184 B2 | 9/2017 | Jaber et al. |
| 9,779,293 B2 | 10/2017 | Kumar et al. |
| 9,977,990 B1 | 5/2018 | Marder |
| 10,008,218 B2 | 6/2018 | Wu et al. |
| 10,102,446 B2 | 10/2018 | Jaber et al. |
| 10,223,584 B2 | 3/2019 | Ekpenyong |
| 10,366,301 B1 | 7/2019 | Linzer et al. |
| 10,434,451 B2 | 10/2019 | Witchey |
| 2002/0001398 A1 | 1/2002 | Shimano et al. |
| 2003/0062414 A1 | 4/2003 | Tsikos et al. |
| 2004/0143504 A1 | 7/2004 | Tsai |
| 2006/0008151 A1 | 1/2006 | Lin et al. |
| 2006/0187305 A1 | 8/2006 | Trivedi et al. |
| 2007/0005356 A1 | 1/2007 | Perronnin |
| 2007/0061226 A1 | 3/2007 | Ajiki et al. |
| 2007/0120736 A1 | 5/2007 | MacKenzie et al. |
| 2007/0179921 A1 | 8/2007 | Zitnick et al. |
| 2008/0008378 A1 | 1/2008 | Andel et al. |
| 2008/0008379 A1 | 1/2008 | Andel et al. |
| 2008/0087727 A1 | 4/2008 | Jenney et al. |
| 2009/0084854 A1 | 4/2009 | Carlson et al. |
| 2009/0103814 A1 | 4/2009 | Nakamura et al. |
| 2009/0116732 A1 | 5/2009 | Zhou et al. |
| 2009/0198371 A1 | 8/2009 | Emanuel et al. |
| 2010/0312913 A1 | 12/2010 | Wittenschlaeger |
| 2011/0038550 A1 | 2/2011 | Obrador |
| 2011/0081081 A1 | 4/2011 | Smith et al. |
| 2011/0106653 A1 | 5/2011 | Wein |
| 2011/0286628 A1 | 11/2011 | Goncalves et al. |
| 2011/0299770 A1 | 12/2011 | Vaddadi et al. |
| 2012/0033874 A1 | 2/2012 | Perronnin et al. |
| 2012/0039539 A1 | 2/2012 | Boiman et al. |
| 2012/0109993 A1* | 5/2012 | Reznik ............... G06V 10/462 |
| 2012/0153662 A1 | 6/2012 | Macneil et al. |
| 2012/0187191 A1 | 7/2012 | Olmstead |
| 2013/0001295 A1 | 1/2013 | Goncalves |
| 2013/0020391 A1 | 1/2013 | Olmstead et al. |
| 2013/0071876 A1 | 3/2013 | Hao et al. |
| 2013/0077873 A1 | 3/2013 | Bar et al. |
| 2013/0142405 A1 | 6/2013 | Nada et al. |
| 2013/0150117 A1 | 6/2013 | Rodriguez et al. |
| 2013/0170723 A1 | 7/2013 | Kwon et al. |
| 2013/0216143 A1 | 8/2013 | Pasteris et al. |
| 2013/0259310 A1 | 10/2013 | Tsukamoto et al. |
| 2013/0273968 A1 | 10/2013 | Rhoads et al. |
| 2013/0315437 A1 | 11/2013 | Kerschner et al. |
| 2014/0003674 A1 | 1/2014 | Coley |
| 2014/0029857 A1 | 1/2014 | Kompalli et al. |
| 2014/0072217 A1 | 3/2014 | Xu et al. |
| 2014/0112526 A1 | 4/2014 | Kim et al. |
| 2014/0355835 A1 | 12/2014 | Rodriguez-Serrano et al. |
| 2015/0193972 A1 | 7/2015 | Algreatly |
| 2015/0221133 A1 | 8/2015 | Groten et al. |
| 2015/0302027 A1 | 10/2015 | Wnuk et al. |
| 2015/0310628 A1 | 10/2015 | Burry |
| 2015/0347801 A1 | 12/2015 | Svetal |
| 2016/0314708 A1 | 10/2016 | Cohain et al. |
| 2017/0357869 A1 | 12/2017 | Shustorovich et al. |
| 2018/0072981 A1 | 3/2018 | Armani et al. |
| 2018/0181826 A1 | 6/2018 | Goncalves et al. |
| 2019/0138853 A1 | 5/2019 | Goncalves et al. |
| 2019/0228252 A1* | 7/2019 | Peng ..................... G06V 30/147 |
| 2019/0244048 A1* | 8/2019 | Saft ......................... G06V 30/36 |
| 2020/0342221 A1* | 10/2020 | Sampath ................ G06N 7/005 |

FOREIGN PATENT DOCUMENTS

| | | | |
|---|---|---|---|
| CN | 104091186 B | * | 5/2017 |
| CN | 109726725 A | * | 5/2019 |
| CN | 109934210 B | | 8/2019 |
| EP | 2366331 B1 | | 7/2013 |
| EP | 3487161 B1 | | 10/2019 |
| GB | 474787 A | | 11/1937 |
| JP | H3238573 | | 10/1991 |
| JP | 5182594 B2 | | 1/2013 |
| JP | 2013021519 A | | 1/2013 |
| JP | 2014029608 A | | 2/2014 |
| JP | 2018022343 A | | 2/2018 |
| JP | 6511980 B2 | | 4/2019 |
| KR | 20160027862 A | | 3/2016 |
| RU | 2595559 C2 | | 8/2016 |
| WO | 2007004868 A1 | | 1/2007 |
| WO | 2010143015 A2 | | 12/2010 |
| WO | 2012103139 A2 | | 8/2012 |
| WO | 2012142756 A1 | | 10/2012 |
| WO | 2013090023 A2 | | 6/2013 |
| WO | WO-2013079098 A1 | * | 6/2013 ......... G06K 9/00993 |
| WO | 2013109802 A1 | | 7/2013 |
| WO | 2013149038 A1 | | 10/2013 |
| WO | 2013150604 A1 | | 10/2013 |
| WO | 2015089115 A1 | | 6/2015 |

OTHER PUBLICATIONS

Bouman, K.L. et al., "A Low Complexity Method for Detection of Text Area in Natural Images," Proceedings of the IEEE International Conference on Acoustics, Speech, and Signal Processing, ICASSP 2010, Mar. 14-19, 2010, Sheraton Dallas Hotel, Dallas, Texas.

Cognex OCRMax Vision Tools, 5 pages.

(56) References Cited

OTHER PUBLICATIONS

Dalal, N. et al., "Histograms of Oriented Gradients for Human Detection," Proceedings of the 2005 IEEE Computer Society Conference on Computer Vision and Pattern Recognition (CVPR'05), 2005, 8 pages.
Deppieri et al., "Optical Character Recognition Localization Tool," U.S. Appl. No. 14/815,741, filed Jul. 31, 2015, 38 pages.
Dollár, P. et al., "Fast Feature Pyramids for Object Detection", Submission to IEEE Transactions on Pattern Analysis and Machine Intelligence, 14 pages, 2014.
Dollár, P. et al., "Crosstalk Cascades for Frame-Rate Pedestrian Detection," European Conference on Computer Vision, Sep. 2012, 14 pages.
Dollár, P. et al., "The Fastest Pedestrian Detector in the West," Proceedings of the British Machine Vision Conference, BMVA Press, Sep. 2010, 11 pages.
Dollár, P. et al., "Integral Channel Features," British Machine Vision Conference, London, England, 2009, 11 pages.
Epshtein, B. et al., "Detecting Text in Natural Scenes with Stroke Width Transform," Proceedings of the IEEE Computer Society Conference on Computer Vision and Pattern Recognition, 8 pages, Jul. 2010.
Ferreira, S. et al., "A Text Detection Technique Applied in the Framework of a Mobile Camera-Based Application", pp. 133-139.
Li, X. "Vehicle License Plate Detection and Recognition", A Thesis presented to the Faculty of the Graduate School at the University of Missouri, 69 pages, Dec. 2010.
Lowe, D.G., "Object Recognition from Local Scale-Invariant Features", Proc. of the International Conference on Computer Vision, Corfu, 8 pages, Sep. 1999.
Minetto, R. et al., "SnooperText: A text detection system for automatic indexing of urban scenes", Computer Vision and Image Understanding, 13 pages, 2013.
Minetto, R. et al., "T-HOG: an Effective Gradient-Based Descriptor for Single Line Text Regions", Preprint submitted to Pattern Recognition, 36 pages, Nov. 1, 2012.
Munich, M.E. et al., "SIFT-ing Through Features with ViPR, Application of Visual Pattern Recognition to Robotics and Automation", Robotics and Automation Magazine, p. 72-77, Sep. 2006.
Newell, A.J. et al., "Multiscale Histogram of Oriented Gradient Descriptors for Robust Character Recognition", 2011 International Conference on Document Analysis and Recognition, pp. 1085-1089, 2011.
Optical Character Recognition in Halcon 12, 1 page.
Ott, P. "Segmentation Features, Visibility Modeling and Shared Parts for Object Detection," PhD thesis, The University of Leeds School of Computing, Feb. 2012, 215 pages.
Ott, P. et al., "Implicit Color Segmentation Features for Pedestrian and Object Detection," IEEE 12th International Conference on Computer Vision, Kyoto, Japan, Sep. 29-Oct. 2, 2009, 8 pages.
Partial European Search Report issued in European Patent Application No. 15179660.4 dated Apr. 12, 2016.
Prates, R.F. et al., "Brazilian License Plate Detection Using Histogram of Oriented Gradients and Sliding Windows", International Journal of Computer Science & Information Technology, vol. 5, No. 6, pp. 39-52, 2013.
Razak, Z. et al., "Off-line Handwriting Text Line Segmentation: A Review", International Journal of Computer Science and Network Security, vol. 7, No. 8, pp. 12-20, 2008.
Svetal, "Object Recognition for Exception Handling in Automatic Machine-Readable Symbol Reader Systems," Amendment, filed Aug. 24, 2015, for U.S. Appl. No. 14/289,950, 14 pages.
Svetal, "Object Recognition for Exception Handling in Automatic Machine-Readable Symbol Reader Systems," Office Action dated Apr. 27, 2015, for U.S. Appl. No. 14/289,950, 32 pages.
Svetal, "Object Recognition for Exception Handling in Automatic Machine-Readable Symbol Reader Systems," U.S. Appl. No. 14/289,950, filed May 29, 2014, 58 pages.
Svetal, U.S. Appl. No. 14/289,950, Notice of Allowance dated Sep. 11, 2015.
Wikipedia, the free encyclopedia, "Histogram of Oriented Gradients", 7 pages, http://en.wikipedia.org/wiki/Histogram_of_oriented_gradients, Jun. 5, 2014.
Zandifar, A. et al., "A Video Based Interface to Textual Information for the Visually Impaired", 6 pages, http://pirl.umd.edu.
Wang, Kai, et al., Wang, K. et al., "Word Spotting in the Wild," Proceedings of the 11th European Conference on Computer Vision: Part 1, Springer-Verlag Berlin, 2010, pp. 591-604.

\* cited by examiner

IMAGE PREPROCESSING FOR OPTICAL CHARACTER RECOGNITION

PRIOR APPLICATION

This application claims the benefit of U.S. Provisional Patent Application No. 62/829,451, filed Apr. 4, 2019, and entitled "ROBUST TEXT AREA DETECTOR FOR INDUSTRIAL OPTICAL CHARACTER RECOGNITION," the entire disclosure of which is incorporated by reference herein.

CROSS-REFERENCE TO RELATED APPLICATION

This application is related to U.S. patent Ser. No. 14/450,394, now U.S. Pat. No. 9,396,404, issued Jul. 19, 2016, the entire disclosure of which is incorporated by reference herein.

TECHNICAL FIELD

The present disclosure generally relates to machine vision and, more particularly, to optical character recognition.

BACKGROUND

Optical character recognition (OCR) is the conversion of scanned or photographed images of alphanumeric or other characters into machine-encoded/computer-readable alpha-numeric or other characters. OCR is used as a form of data entry from some sort of original data source, such as product packaging (e.g., a bag of chips, a box, etc.), books, receipts, business cards, mail, or any other object having characters printed or inscribed thereon. OCR is a common method of digitizing printed characters so that the characters can be electronically identified, edited, searched, stored more compactly, displayed on-line, or used in machine processes such as machine translation, text-to-speech, verification, key data extraction, and text mining.

OCR is frequently used in many computer vision systems to detect text associated with various manufacturing processes. For example, OCR may be used to verify that a label has been correctly printed on a packaging for a product. In a specific implementation, OCR may be used to verify the presence of a "best before date" label on a product's packaging. The best before date is a piece of information written on the package of perishable foods that identifies the date past which a product is no longer suitable for consumption. Typically, inkjet printers are used to write the best before date on the otherwise pre-printed packages since inkjet printers represent a mature and reliable technology, are capable of printing at high speeds, and are relatively low cost. Nevertheless, occasionally errors may occur in the printing process (e.g., low contrast, missing characters), which compels verification that the labels are printed correctly.

Typically, the OCR process can be viewed as a combination of two main sub-processes: (1) segmentation and (2) recognition (e.g., classification). The segmentation sub-process locates and "isolates" the individual characters. The recognition sub-process classifies the characters in question and assigns to each character a corresponding alpha-numerical or other character or symbol. The OCR process is typically divided into two sub-processes because the classification sub-process is computationally expensive, and therefore it is advantageous that the classification sub-process not be done throughout an entire image, but rather only at select locations where the segmentation sub-process has detected a potential character. For high quality images, characters are well separated and segmentation sub-process becomes relatively straightforward. However, often images suffer from low contrast, high degree of noise, character variation, character skew, background variation, or other non-ideal factors. These factors complicate the segmentation sub-process, and segmentation errors lead to the failure in the recognition sub-process.

Moreover, whereas some OCR applications are called upon to recognize all of the text in a captured image, in other applications only certain text needs to be recognized. In these latter types of applications the OCR resources may be spent on needless processing to recognize text that is not of interest. These adverse effects may be particularly felt in throughput-demanding scenarios, such as recognizing text on objects on a fast-moving conveyor belt, where the overall OCR processing capacity may suffer in the presence of text that is not of interest.

SUMMARY

According to some aspects of this disclosure, an image processing system includes an input to receive a captured image that contains: (a) a region of interest (ROI) including a plurality of characters to be autonomously recognized as text and included in an output of an optical character recognition (OCR) system, and (b) non-ROI content to be excluded from the OCR system output. A region of interest (ROI) preprocessing engine is operatively coupled to the input to perform autonomous processing of the captured image to detect and locate the ROI in the captured image, and to determine a boundary of the ROI. The autonomous processing includes a transformation of the captured image to a first feature descriptor representation (FDR) of the captured image; and comparison between the first FDR and at least one ROI template that includes at least a second FDR of a representative ROI image. The autonomous processing produces an output to be provided to an OCR engine to perform autonomous OCR processing of the ROI while ignoring the non-ROI content based on the determined boundary of the ROI.

In a related aspect, a machine-implemented method for processing images includes operations comprising: receiving a captured image that contains: (a) a region of interest (ROI) including a plurality of characters to be autonomously recognized as text and included in an output of an optical character recognition (OCR) system, and (b) non-ROI content to be excluded from the OCR system output; autonomously processing the captured image to detect and locate the ROI in the captured image, and to determine a boundary of the ROI, wherein the processing includes performing a transformation of the captured image to a first feature descriptor representation (FDR) of the captured image, and performing comparison between the first FDR and at least one ROI template that includes at least a second FDR of a representative ROI image. The processing produces an output to be provided to an OCR engine to perform autonomous OCR processing of the ROI while ignoring the non-ROI content based on the determined boundary of the ROI.

In another related aspect, at least one non-transitory machine-readable medium contains instructions for processing images, wherein the instructions, when executed on a computing system, cause the computing system to receive a captured image that contains (a) a region of interest (ROI) including a plurality of characters to be autonomously recognized as text and included in an output of an optical character recognition (OCR) system, and (b) non-ROI content to be excluded from the OCR system output. The instructions further cause the computing system to perform autonomous processing of the captured image to detect and locate the ROI in the captured image, and to determine a boundary of the ROI, wherein the processing includes performing a transformation of the captured image to a first feature descriptor representation (FDR) of the captured image, and performing comparison between the first FDR and at least one ROI template that includes at least a second FDR of a representative ROI image. The processing produces an output to be provided to an OCR engine to perform autonomous OCR processing of the ROI while ignoring the non-ROI content based on the determined boundary of the ROI.

DETAILED DESCRIPTION

Figure 1A:
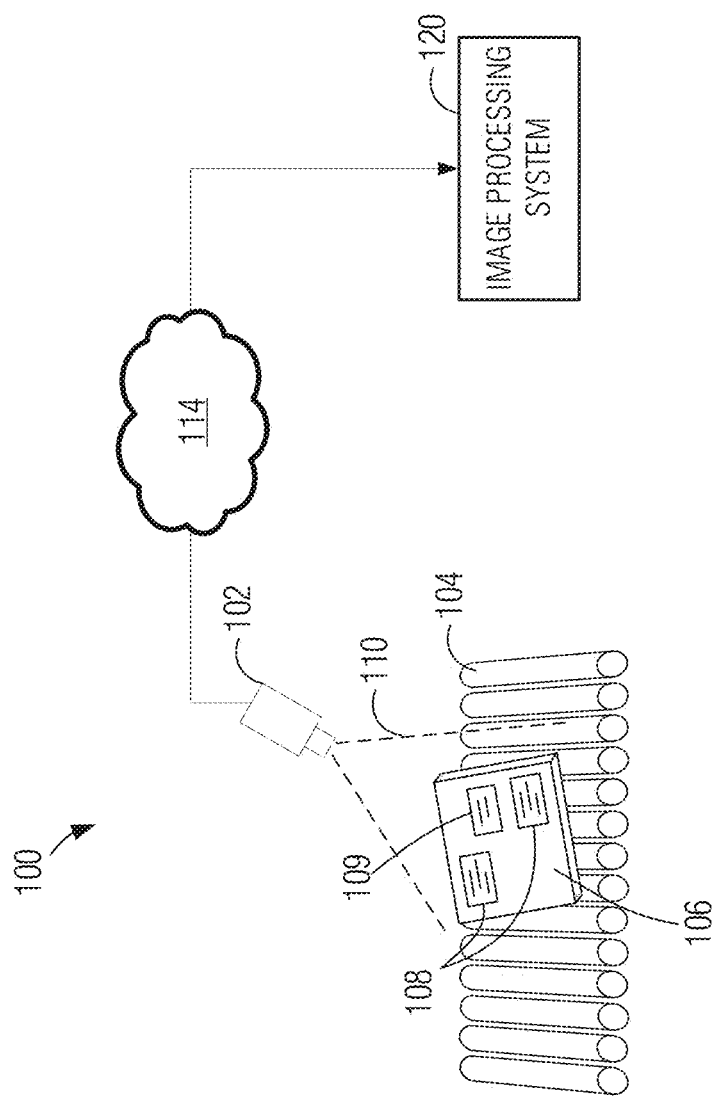
FIG. 1A is a diagram illustrating an implementation depicting an optical character recognition (OCR) system, according to at least one example.

The illustrations included herewith are not meant to be actual views of any particular systems, memory device, architecture, or process, but are merely idealized representations that are employed to describe embodiments herein. Elements and features common between figures may retain the same numerical designation except that, for ease of following the description, for the most part, reference numerals begin with the number of the drawing on which the elements are introduced or most fully described. In addition, the elements illustrated in the figures are schematic in nature, and many details regarding the physical layout and construction of a memory array and/or all steps necessary to access data may not be described as they would be understood by those of ordinary skill in the art.

As used herein, the singular forms "a," "an," and "the" are intended to include the plural forms as well, unless the context clearly indicates otherwise.

As used herein, "or" includes any and all combinations of one or more of the associated listed items in both, the conjunctive and disjunctive senses. Any intended descriptions of the "exclusive-or" relationship will be specifically called out.

As used herein, the term "configured" refers to a structural arrangement such as size, shape, material composition, physical construction, logical construction (e.g., programming, operational parameter setting) or other operative arrangement of at least one structure and at least one apparatus facilitating the operation thereof in a defined way (e.g., to carry out a specific function or set of functions).

As used herein, the phrases "coupled to" or "coupled with" refer to structures operatively connected with each other, such as connected through a direct connection or through an indirect connection (e.g., via another structure or component).

One or more implementations of the present disclosure provide robust optical character recognition (OCR) systems, methods, and articles for use in commercial or industrial environments. FIG. 1A is a diagram illustrating an implementation depicting an optical character recognition (OCR) system 100, according to at least one example. As discussed further below, the OCR system 100 may be employed to automatically recognize one or more characters or symbols in an image of a target object. The OCR system 100 described herein may be used at any suitable time, such as during a verification sub-process in a manufacturing process.

In some embodiments, the OCR system 100 may include an image capture device 102, such as a camera or scanner. Appropriate interfaces (e.g., wired, wireless) may be connected to and/or installed in the image capture device 102 so that the image capture device captures an image of a target object 106. In the illustrated embodiment, a conveyor 104 carries target objects 106 having characters, numerals, or other textual symbols printed or otherwise inscribed thereon during a manufacturing process, shipping, warehousing, or other handling process. The target objects 106 may pass in turn within a field of view (FOV) 110 of the image capture device 102 during an inspection (e.g., verification) process. As such, the image capture device 102 acquires at least one image of each of the target objects 106.

The text on target object 106 may be of interest in the given scenario, or it may be irrelevant. One aspect of this disclosure is directed to distinguishing between one or more region of interest (ROI) 108 containing multiple symbols of text in a clustered, or closely-grouped arrangement, which is to be recognized by the OCR system, and non-ROI text 109 that may also be present on target object 106. The non-ROI text 109 is preferably to be ignored by OCR system 100 to conserve computational resources that may otherwise be applied to increase OCR throughput for the ROIs 108 on target objects 106. Hence, by avoiding the computational burden of performing OCR on non-ROI portions of text 109, OCR system 100 can accommodate a higher frame rate of image capture, allowing faster movement of target objects or higher densities of target objects. Similarly, the increased efficiency of OCR operation that is beneficially limited to only performing OCR on regions of interest 108 allows the OCR system 100 to be implemented on relatively less expensive computing hardware while providing OCR performance at a level comparable to conventional OCR technology implemented on more powerful computing hardware.

In some embodiments, the image capture device 102 may be operatively coupled to an image processing system 120 through a network 114 (e.g., LAN, WAN, PAN, Internet). The image processing system 120 receives digital images from the image capture device 102. In some embodiments, the image capture device 102 may be connected directly to the image processing system 120 through a suitable local interface (e.g., USB) or may be integrated with the image processor system and interconnected using an internal interconnect such as a suitable variant of a peripheral component interconnect (PCI), serial AT Attachment (SATA), mobile industry processor interface (MIPI), or other interconnects known by those skilled in the art.

Figure 1B:
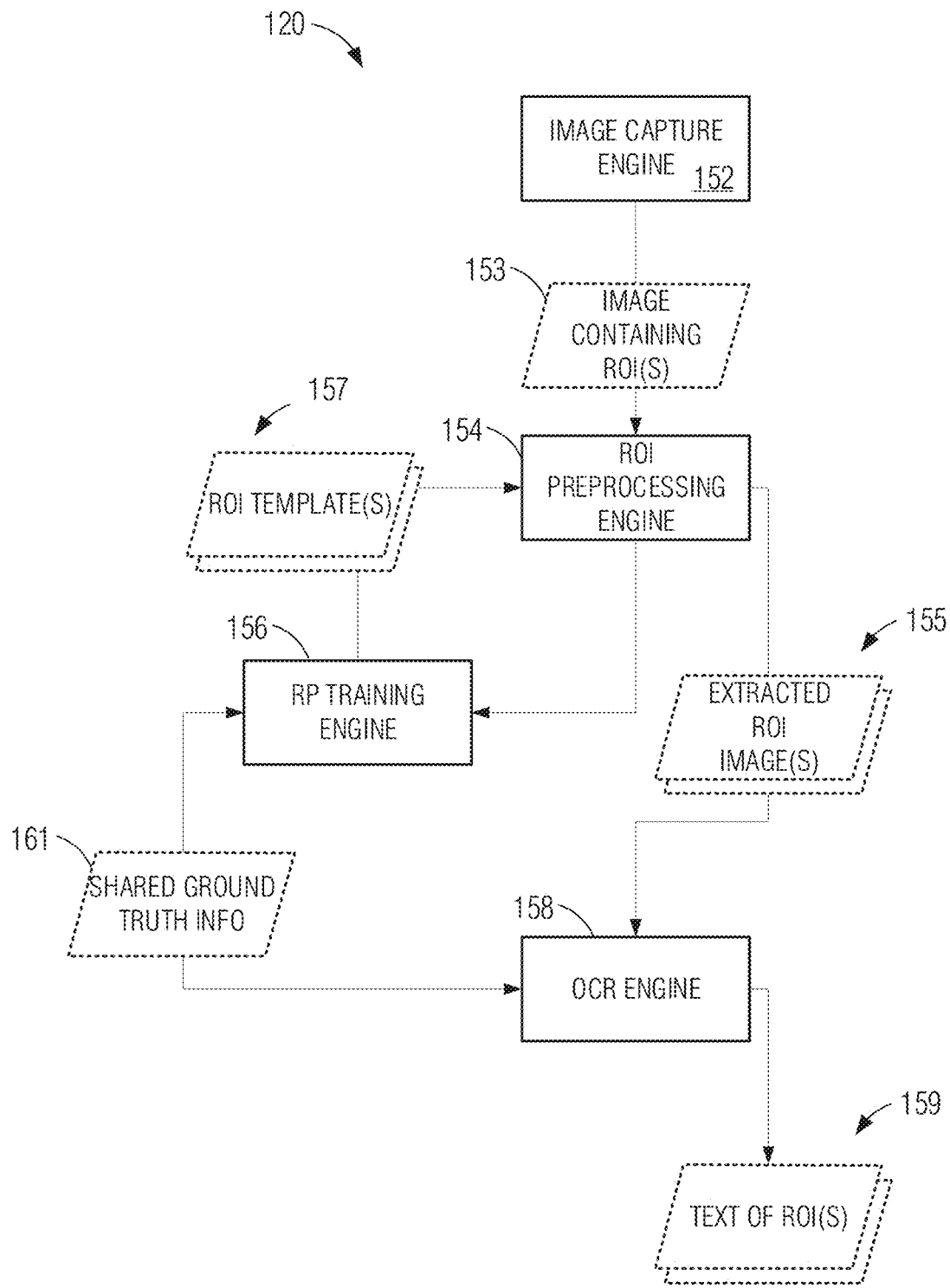
FIG. 1B is a high-level block diagram illustrating an example system architecture of an image processing system of the OCR system shown in FIG. 1A.

FIG. 1B is a high-level block diagram illustrating an example system architecture of image processing system 120. Image processing system 120 includes various engines, each of which is configured to carry out a function or set of functions, as detailed below. The term "engine" as used herein means a tangible device, component, or arrangement of components implemented using hardware, such as by an application specific integrated circuit (ASIC) or field-programmable gate array (FPGA), for example, or as a combination of hardware and software, such as by a processor-based computing platform and a set of program instructions that transform the computing platform into a special-purpose device to implement the particular functionality. An engine may also be implemented as a combination of the two, with certain functions facilitated by hardware alone, and other functions facilitated by a combination of hardware and software.

In an example, the software may reside in executable or non-executable form on a tangible machine-readable storage medium. Software residing in non-executable form may be compiled, translated, or otherwise converted to an executable form prior to, or during, runtime. In an example, the software, when executed by the underlying hardware of the engine, causes the hardware to perform the specified operations. Accordingly, an engine is specifically configured (e.g., hardwired), or temporarily configured (e.g., programmed) to operate in a specified manner or to perform part or all of any operations described herein in connection with that engine.

In examples in which engines are temporarily configured, each of the engines may be instantiated at different moments in time. For example, where the engines comprise a general-purpose hardware processor core configured using software; the general-purpose hardware processor core may be configured as respective different engines at different times. Software may accordingly configure a hardware processor core, for example, to constitute a particular engine at one instance of time and to constitute a different engine at a different instance of time.

In certain implementations, at least a portion, and in some cases, all, of an engine may be executed on the processor(s) of one or more computers that execute an operating system, system programs, and application programs, while also implementing the engine using multitasking, multithreading, distributed (e.g., cluster, peer-peer, cloud, etc.) processing where appropriate, or other such techniques. Accordingly, each engine may be realized in a variety of suitable configurations, and should generally not be limited to any particular implementation exemplified herein, unless such limitations are expressly called out.

In addition, an engine may itself be composed of more than one sub-engines, each of which may be regarded as an engine in its own right. Moreover, in the embodiments described herein, each of the various engines corresponds to a defined functionality; however, it should be understood that in other contemplated embodiments, each functionality may be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

As depicted in FIG. 1B, image processing system 120 includes image capture engine 152, which provides an interface with one or more camera 102 or other image-capture devices. Image capture engine 152 receives image files or video frames, and converts the format to a suitable image and data structure type for subsequent processing. For instance, a captured image may be received over network 114 while in a compressed format (e.g., .png, .tiff, .jpg), or as a video stream (e.g., .mov, .m2s, .mpg, .wmv), and converted to a single image file (in the case where the captured image is part of a motion video) in a bitmap or other format suitable for processing. The received image may also be formatted from color to grayscale or monochrome, and stored in an image database, file system, or other suitable data storage arrangement. Image capture engine 152 produces, as its output, image 153, which contains at least a portion of target object 106, including one or more ROIs 108.

ROI preprocessing engine 154 receives image 153 and works to detect and locate the one or more text-containing ROIs 108 from the image on which OCR operations are to be performed. In some implementations, ROI preprocessing engine 154 may extract (e.g., crop around) the ROI to produce an image containing substantially only the ROI (i.e., with any additional content outside the boundary of the ROI being immaterial to the subsequent OCR operation). In related implementations, ROI preprocessing engine 154 produces images of extracted ROIs 155 for subsequent OCR processing, which omits non-ROI text and other extraneous content.

In other implementations, ROI preprocessing engine 154 produces an indication of the ROI boundaries in image 153 without necessarily extracting the ROI to exclude the extraneous content. The ROI boundary information may be used by a subsequent OCR operation to focus the processing only on the designated ROI.

In some implementations, ROI preprocessing engine 154 includes machine-learning functionality that allows it to adapt to changing conditions and the characteristics of the text of interest. Upon detecting the presence of one or more ROIs in image 153, ROI preprocessing engine 154 locates those one or more ROIs in the image and extracts each ROI as the extracted ROIs 155, with each one being in isolation from the non-ROI portions of image 153.

As described in more detail below, ROI processing engine 154 compares one or more ROI templates 157 to parts of the image 153 and determines a similarity score representing the likelihood of the presence of corresponding ROI 108 in image 153. Each ROI template 157 represents a known, or familiar, representative ROI layout. ROI template 157 is in a format containing feature descriptors of the layout of the corresponding ROI.

The layout of a ROI in the present context describes the basic appearance, or arrangement, of textual or graphical features contained within the ROI. For example, a given layout may have a defined quantity of lines of text of relative length, with each line containing a specified number of characters of relative size and spaces in particular locations. The relative positioning and sizing of the lines of characters and the characters themselves, within the ROI may constitute features of the layout, as may any other symbols, graphics, lettering type or style (e.g., block vs. script lettering, lettering in Latin vs. Chinese vs. Arabic, or various typefaces), barcodes, and other types of visual indicia. Notably, for a given layout, the values of the individual characters may vary from sample to sample, but the general positioning and relative arrangement of the characters and, consequently, the basic appearance of the ROI, remains similar across ROI samples having that layout. Thus, a layout of an ROI describes an envelope—such as a general shape—of the ROI, as well as discernable features such as edge features (e.g., lines, curves, corners) and their relative positioning and density distribution within the ROI. In some embodiments, the feature descriptors representing the ROI layout are algorithmically generated. For instance, one type of feature descriptors is based on oriented gradients of the image portion consisting of the ROI. For example, the feature descriptors may be generated by a histogram of oriented gradients (HOG) transform.

ROI preprocessing engine 154 computes a set of feature descriptors of image 153 and compares the one or more ROI template 157 (in the form of feature descriptors of the one or more ROI layouts of interest). The comparison may be effected using a sliding window or other suitable technique with a comparison operation. For example, a zero-mean normalized cross correlation (ZMNCC) computation may be performed at each position of the sliding window. Various related operations may also be carried out to provide scaling and rotational invariance for the comparison. The result of the comparison is a data structure indicative of any ROIs 108 detected in image 153 (represented as a similarity score for the layouts of any ROIs 108 in image 153 and templates 157) and the locations of those ROIs 108 in image 153. In some embodiments, ROI preprocessing engine 154 may further perform a fine-resolution location detection process based on corrections made to image 153 for rotation and scaling.

ROI preprocessing engine 154 crops around each detected and located ROI 108 in scaled and rotated image 153 to extract that ROI 108. Each extracted ROI may be saved as an individual image 155, and the set of one or more extracted ROI images 155 is passed as the output from ROI preprocessing engine 154 to OCR engine 158.

ROI preprocessing (RP) training engine 156 works to configure ROI preprocessing engine 154 to recognize one or more ROIs. In some examples, RP training engine 156 applies an adaptive training algorithm that automatically determines one or more image-processing parameters to optimize discriminator performance. RP training engine 156 produces ROI templates 157 based on user-provided examples of ROI layouts.

In a related implementation, RP training engine 156 performs status monitoring and evaluation operations that determine a need for additional training or other operational parameter updating for ROI preprocessing engine 154. In additional related implementations, certain ground truth information 161 is shared between RP training engine 156 and OCR engine 158.

OCR engine 158 receives, as its input, one or more extracted ROI images 155, and performs OCR operations to recognize the text in those ROI images 155. Any suitable OCR algorithm or combination of techniques may be employed by OCR engine 158. According to some implementations, one or more of the embodiments disclosed in U.S. Pat. No. 9,396,404, issued Jul. 19, 2016, and entitled "Robust Industrial Optical Character Recognition," incorporated by reference in this disclosure, may be carried out by OCR engine 158. Regardless of the type of OCR methodology, operation of OCR engine 158 is computationally efficient by virtue of the input ROI images 155 substantially being free from extraneous (non-ROI) content. The output of OCR engine 158 includes one or more data structures (e.g., files, text strings) containing recognized text from each extracted ROI image 155.

OCR engine 158 may include a training engine (not shown) that works to provide tuning and optimization of the OCR functionality at the character level. Some examples of the functionality of OCR training engine 160 are described in incorporated U.S. Pat. No. 9,396,404. In some examples, to develop the OCR system, training images of the character-level symbols to be detected, such as letters, numerals, punctuation marks, and the like, as well as non-detection objects that look like the detection objects, may be used to train OCR engine 158. Labeled training images of characters may be used to build feature descriptors for the characters, as well as to train a classifier that decides which detections are actually characters. In some implementations, HOG-based feature descriptors may be used at the character level by OCR training engine 160 and OCR engine 158 in a generally similar manner as ROI-level feature descriptors that are used for detecting the presence of the one or more ROIs by ROI preprocessing engine 154.

The image processor system 120 may take the form of one or more server computer systems with associated nontransitory processor-readable storage media (e.g., the data store 118). While illustrated as a single computer system and associated nontransitory storage media, many implementations may employ two or more computer systems and/or nontransitory associated processor- or computer-readable storage media. In some implementations or instances, the nontransitory processor- or computer-readable media may include a database or other data structure which stores one or more of: image data, model data, training data, test data, parameter data, character detection or recognition algorithms, and/or other data.

While generally described below in terms of a user interface generated via instructions executing on a computing device, in some implementations the image processor system 120 may serve as a user portal that may operate, for example, as a Web server, serving HTML pages or providing Web services which function as the user interface. Thus, in some implementations, the image processor system 120 serves as a user portal, providing a user interface, for instance a Web based interface, which allows users access functionality disclosed herein via various other processor-based computing devices.

While often illustrated as a single nontransitory processor-readable storage medium, in many implementations each of the various illustrated nontransitory computer- or processor-readable storage media may constitute a plurality of nontransitory storage media. The plurality of nontransitory storage media may be commonly located at a common location, or distributed at a variety of remote locations. Database(s) may be stored separately from one another on separate computer- or processor-readable storage medium or may be stored on the same computer- or processor-readable storage medium as one another. Various computer- or processor-readable storage medium may be co-located with the corresponding computer systems, for example, in the same room, building or facility. Alternatively, various computer- or processor-readable storage medium may be located remotely from the corresponding computer systems (e.g., server computer systems) for example, in a different facility, city, state or country. Electronic or digital information, files or records or other collections of information may be stored at specific locations in non-transitory computer- or processor-readable media, thus are logically addressable portions of such media, which may or may not be contiguous.

Figure 2:
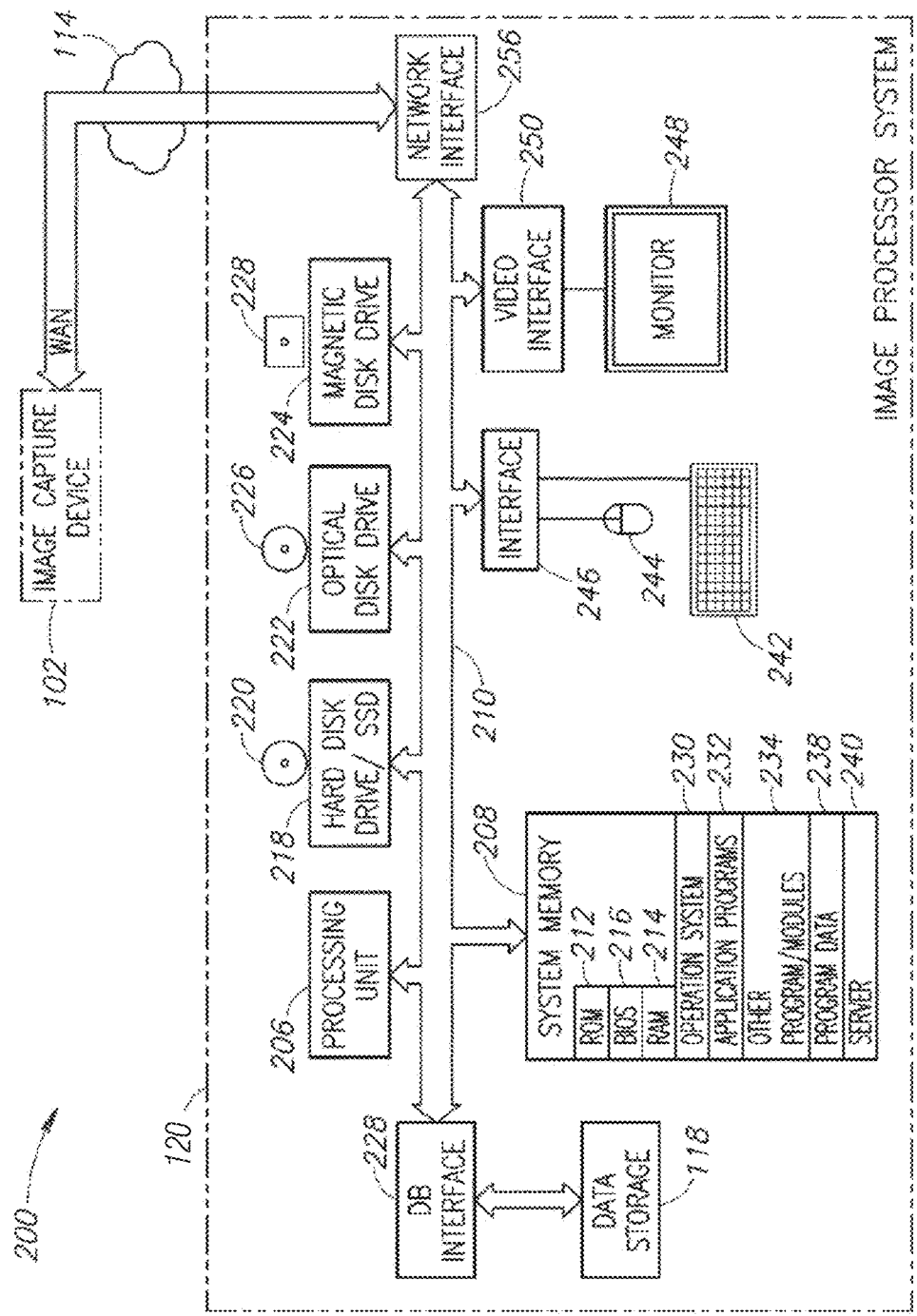
FIG. 2 is a diagram illustrating an example of hardware components with which the OCR system, including the image processor system, as depicted in FIGS. 1A and 1B, can be implemented.

FIG. 2 and the following discussion provide a brief, general description of an example of hardware components with which OCR system 100, including the image processor system 120, can be implemented. Although not required, some portion of the embodiments will be described in the general context of computer-executable instructions or logic, such as program application modules, objects, or macros being executed by a computer. Those skilled in the relevant art will appreciate that the illustrated embodiments as well as other embodiments can be practiced with other computer system or processor-based device configurations, including handheld devices for instance smart phones, multiprocessor systems, microprocessor-based or programmable consumer electronics, personal computers ("PCs"), network PCs, minicomputers, mainframe computers, and the like. The embodiments can be practiced in distributed computing environments where tasks or modules are performed by remote processing devices, which are linked through a communications network. In a distributed computing environment, program modules may be located in both local and remote memory storage devices.

The image processor system 120 may take the form of conventional computing hardware (e.g., PC, server, or other computing system) 200 executing logic or other machine executable instructions that transform the conventional computing hardware into special-purpose image processor system 120. As depicted, computing hardware 200 includes one or more processors 206, a system memory 208 and a system bus 210 that couples various system components including the system memory 208 to the processor 206. The image processor system 120 will at times be referred to in the singular herein, but this is not intended to limit the embodiments to a single system, since in certain embodiments, there will be more than one image processor system 120 or other networked computing device involved.

The processor 206 may be any logic processing unit, such as one or more central processing units (CPUs), microprocessors, digital signal processors (DSPs), graphics processors (GPUs), application-specific integrated circuits (ASICs), field programmable gate arrays (FPGAs), etc. Unless described otherwise, the construction and operation of the various blocks shown in FIG. 2 are of conventional design. As a result, such blocks need not be described in further detail herein, as they will be understood by those skilled in the relevant art.

The system bus 210 can employ any known bus structures or architectures, including a memory bus with memory controller, a peripheral bus, and a local bus. The system memory 208 includes read-only memory ("ROM") 212 and random access memory ("RAM") 214. A basic input/output system ("BIOS") 216, which may be incorporated into at least a portion of the ROM 212, contains basic routines that help transfer information between elements within the image processor system 120, such as during start-up. Some embodiments may employ separate buses for data, instructions and power.

The computing hardware 200 also may include a hard disk drive 218 for reading from and writing to a hard disk 220, and an optical disk drive 222 and a magnetic disk drive 224 for reading from and writing to removable optical disks 226 and magnetic disks 228, respectively. The optical disk 226 can be a CD or a DVD, while the magnetic disk 228 can be a magnetic floppy disk or diskette. The hard disk drive 218, optical disk drive 222 and magnetic disk drive 224 communicate with the processor 206 via the system bus 210. The hard disk drive 218, optical disk drive 222 and magnetic disk drive 224 may include interfaces or controllers (not shown) coupled between such drives and the system bus 210, as is known by those skilled in the relevant art. The drives 218, 222, 224, and their associated computer-readable media 220, 226, 228, respectively, provide nonvolatile storage of computer-readable instructions, data structures, program modules and other data for the image processor system 120. Those skilled in the relevant art will appreciate that other types of computer-readable media may be employed to store data accessible by a computer, such as magnetic cassettes, flash memory cards, Bernoulli cartridges, RAMs, ROMs, smart cards, etc.

Program modules can be stored in the system memory 208, such as an operating system 230, one or more application programs 232, other programs or modules 234, and program data 238. The application program(s) 232 may include logic capable of providing the OCR and OCR pre-processing functionality described herein. For example, applications programs 232 may receive digital images captured from the image capture device 102 or stored in a data store. The system memory 208 may include communications programs 240 that permit the image processor system 120 to access and exchange data with other networked systems or components, such as the image capture device 102 and/or other computing devices.

While shown in FIG. 2 as being stored in the system memory 208, the operating system 230, application programs 232, other programs/modules 234, program data 238 and communications 240 can be stored on the hard disk 220 of the hard disk drive 218, the optical disk 226 of the optical disk drive 222 and/or the magnetic disk 228 of the magnetic disk drive 224.

Authorized personnel can enter commands (e.g., system maintenance, upgrades, etc.) and information (e.g., OCR parameters, equations, models, etc.) into the image processor system 120 using one or more communicably coupled input devices such as a touch screen or keyboard 242, a pointing device such as a mouse 244, and/or a push button (not shown). Other input devices can include a microphone, joystick, game pad, tablet, scanner, biometric scanning device, etc. These and other input devices are connected to the processing unit 206 through an interface 246 such as a universal serial bus ("USB") interface that couples to the system bus 210, although other interfaces such as a parallel port, a game port or a wireless interface or a serial port may be used. A monitor 248 or other display device is coupled to the system bus 210 via a video interface 250, such as a video adapter. In at least some instances, the input devices may be located proximate the image processor system 120, for example when the system is installed at the system user's premises. In other instances, the input devices may be located remote from the image processor system 120, for example when the system is installed on the premises of a service provider.

In some implementations, the image processor system 120 uses one or more of the logical connections to optionally communicate with one or more remote computers, servers and/or other devices via one or more communications channels, for example, one or more networks 114. These logical connections may facilitate any known method of permitting computers to communicate, such as through one or more LANs and/or WANs. Such networking environments are well known in wired and wireless enterprise-wide computer networks, intranets, extranets, and the Internet.

In some implementations, a network port or interface 256, communicatively linked to the system bus 210, may be used for establishing and maintaining communications over the communications network 114. Further, a data store interface 252, which is communicatively linked to the system bus 210, may be used for establishing communications with the nontransitory processor-readable storage medium or data store 118, which may a part of the image processor system 120 or at least in operative communication therewith. For example, the data store 118 may include a repository for storing information regarding OCR parameters, models, image data, etc. In some embodiments, the database interface 252 may communicate with the data store 118 via the networks 114.

In the OCR system 100, program modules, application programs, or data, or portions thereof, can be stored in one or more computing systems. Those skilled in the relevant art will recognize that the network connections shown in FIG. 2 are only some examples of ways of establishing communications between computers, and other connections may be used, including wirelessly. In some embodiments, program modules, application programs, or data, or portions thereof, can even be stored in other computer systems or other devices (not shown).

For convenience, the processor 206, system memory 208, network port 256 and interfaces 246, 252 are illustrated as communicatively coupled to each other via the system bus 210, thereby providing connectivity between the above-described components. In alternative embodiments, the above-described components may be communicatively coupled in a different manner than illustrated in FIG. 2. For example, one or more of the above-described components may be directly coupled to other components, or may be coupled to each other, via intermediary components (not shown). In some embodiments, system bus 210 is omitted and the components are coupled directly to each other using suitable connections.

Figure 3:
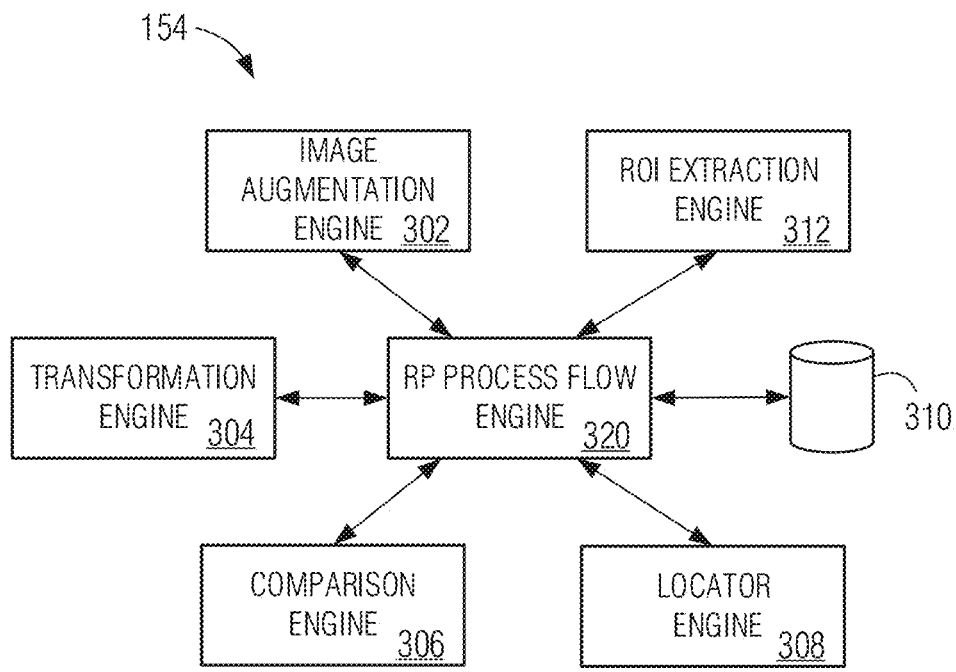
FIG. 3 is a system-architecture diagram illustrating a region of interest (ROI) preprocessing engine of the image processing system as shown in FIGS. 1A and 1B, in greater detail according to an example implementation.

FIG. 3 is a system-architecture diagram illustrating ROI preprocessing engine 154 in greater detail according to an example implementation. As illustrated, ROI preprocessing engine 154 includes image augmentation engine 302, transformation engine 304, comparison engine 306, locator engine 308, data store 310, ROI extraction engine 312, and RP process flow engine 320. RP process flow engine 320 coordinates the operations of, and data flow between, engines 302-308 and 312, and data store 310, to implement the functionality of ROI preprocessing engine 154, which is described in greater detail below.

Image augmentation engine 302 is constructed, programmed, or otherwise configured, to perform one or more image processing operations such as scaling, noise filtering, and rotation on image 153, and one or more of ROI templates 157. Transformation engine 403 is constructed, programmed, or otherwise configured, to generate feature descriptor data structures representing corresponding images. For instance, transformation engine 403 may compute a HOG transform of image 153 or on portions thereof.

Comparison engine 306 is constructed, programmed, or otherwise configured, to compare the feature-descriptor representation (FDR) (e.g., HOG transform) of image 153 (and, optionally, augmented versions of image 153) with ROI template(s) 157 (and, optionally, augmented versions of templates 157). In some implementations, comparison engine uses a sliding window comparison technique by which each template is progressively scanned over the FDR(s) of image 153, and a cross-correlation or other suitable comparison function is computed. In one particular example, comparison engine 306 computes a zero-mean normalized cross-correlation (ZMNCC) function using the sliding-window technique. The comparison computation works to produce, as its output, a data structure indicative of the likelihood of any presence of feature descriptors corresponding to the one or more templates 157 in the one or more feature-description representations of image 153.

In some examples, as described in greater detail below, comparison engine 306 may be used to perform comparison operations on multiple image-augmented variations of image 153, such as variations that are scaled at different image resolutions. Similarly, various rotated orientations of templates 157 may be compared to each augmented variation of image 153. The various scaled and rotated comparison operations provide distance and rotational invariance in detecting the presence and location of ROIs 108. In a related example, the peak comparison score for each scale-augmented variation of image 153, and for each rotation angle of a template 157 may be stored as a matrix represented as an array or other suitable data structure. It should be noted that the rotation and scaling variations are relative as between each template 157 and feature-description representation of image 153; therefore, templates 157 may be scaled and image 153 may be rotated in any combination, though certain operational efficiencies may be realized with applying certain augmentations to image 153 vs. template 157.

Locator engine 308 is configured to process the result of the comparison computation to determine a positive detection of one or more ROIs in image 153, and to determine a location of the center of the ROI(s). In some examples, locator engine 308 applies a detection threshold to the output of comparison engine 306 that, if exceeded by a peak of the comparison result, indicates a presence of the corresponding ROI.

In a related example, locator engine 308 performs a regression analysis operation to more accurately locate the center of the ROI 108 in image 153. For instance, a parabolic surface may be fitted to the matrix of peak comparison values obtained at the various scaling and rotational variations. The fitted parabola's apex may coincide with an optimal scaling and rotational angle. Notably, the regression technique can achieve sub-step resolution.

Data store 310 maintains templates 157, along with image-augmented variations of the templates. Likewise, data store 310 may maintain image 153, image-augmented variation of image 153, and FDR(s) of image 153 and its image-augmented variations.

ROI extraction engine 312 is constructed, programmed, or otherwise configured, to crop an image of each ROI 108 from image 153 based on the determined rotation, scaling, and position of the detected ROI(s) 108. The ROI cropping may add a safety margin around the boundary of the ROI to be extracted to capture a specified amount of additional surrounding image content to reduce the likelihood of omitting any text of interest from the extracted ROI images. Each extracted ROI image may be saved as a separate file or other data structure to be passed to OCR engine 158.

Figure 4:
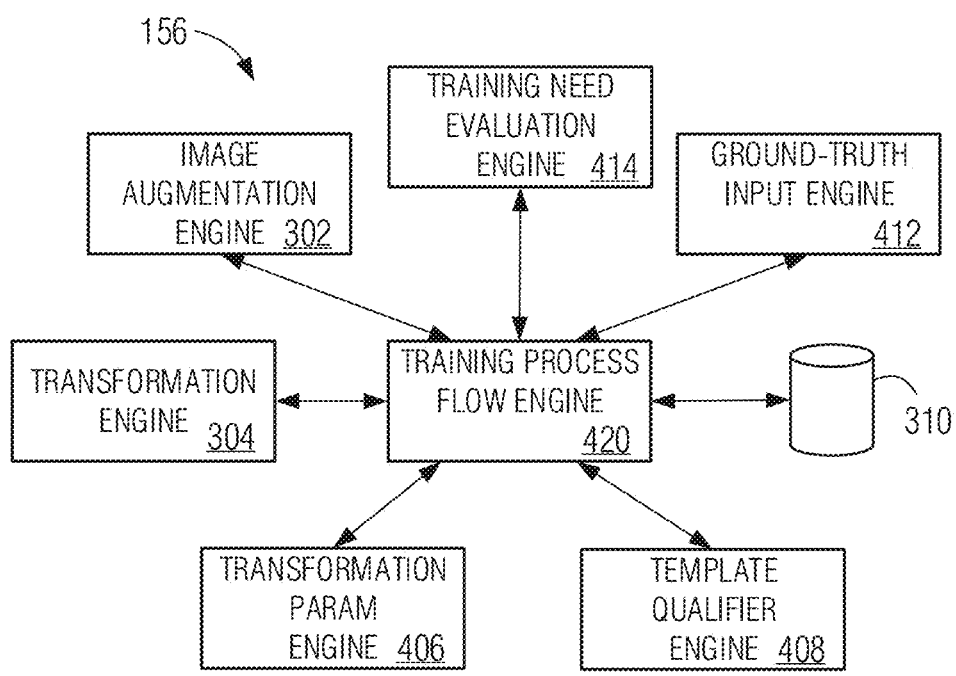
FIG. 4 is a system-architecture diagram illustrating a ROI preprocessing (RP) training engine of the image processing system as shown in FIGS. 1A and 1B, in greater detail according to an example implementation.

FIG. 4 is a system-architecture diagram illustrating RP training engine 156 in greater detail according to some examples. As depicted RP training engine 156 makes use of image augmentation engine 302, transformation engine 304, and data store 310. Each of these components operate as described above with reference to FIG. 3. RP training engine 156 further includes transformation parameter engine 406, template qualifier engine 408, ground-truth input engine 412, training need evaluation engine 414, and training process flow engine 420. Training process flow engine 420 coordinates the operations of, and data flow between, engines 302-304 and 406-414, as well as data store 310, to implement the functionality of RP training engine 156, which is described in greater detail below. In general, training process flow engine 420 causes RP training engine 156 to generate one or more ROI templates 157 based on one or more ROI detection training images provided as input to RP training engine 156.

Transformation parameter engine 406 is constructed, programmed, or otherwise configured, to determine value(s) for one or more variable parameters associated with the computation of the transform by transformation engine 304. For example, a variable parameter for a HOG transform may include the spatial bin size, which defines the resolution of the HOG transform. The spatial bin size may be determined by transformation parameter engine 406 based on a determination of average character size in the ROI-detection training image, the size of the ROI, or some combination thereof, along with parameter-determination criteria.

Template qualifier engine 408 is constructed, programmed, or otherwise configured, to test the ROI-detection performance of each newly-created ROI template 157 in order to determine whether to add that ROI template 157 to the current set of ROI templates 157 to be used for ROI detection. In one example, template qualifier engine 408 tests the current set of ROI templates 157 on a test image containing one or more ROIs 108 and collects corresponding comparison scores for each ROI template 157 of the current set. Testing may be performed by calling for certain operations of ROI preprocessing engine 154. The newly-created ROI template 157 is likewise tested on the same test image and the resulting comparison score may be compared to the comparison score achieved from the current set of ROI templates.

In some examples, the newly-created ROI template 157 may replace one or more ROI templates of the current set; in other examples, the newly-created ROI template 157 may be appended to the current set. Template qualifier engine 408 includes qualification criteria that set forth the conditions and requirements for appending or replacing ROI templates 157. For instance, in an example implementation, the qualification criteria may define a correlation score threshold representing a minimum acceptable correlation score to be achieved in the testing of a ROI template 157. If the current set of ROI templates 157 fails to meet the correlation score threshold, the newly-created ROI template 157 may be added or appended to the current set. Other applicable criteria may also be applied, such as criteria representing discrimination performance of a ROI template 157. For instance, the test image may contain a non-ROI text 109 that has some similarity to a ROI 108 of interest but is sufficiently different that the non-ROI text 109 should properly not be identified as a ROI 108. The newly-created ROI template 157 may be tested to measure its performance in avoiding false positive detections (e.g., using a discrimination threshold such as a maximum similarity score limit that is not to be exceeded).

Ground-truth input engine 412 is constructed, programmed, or otherwise configured, to receive input describing training data, such as one or more of the following types of information: training images, examples of ROIs 108, information about character location, character center, character size in ROIs 108, character boundaries, ROI boundaries, and the like. Ground-truth input engine 412 may include a user interface through which at least some of the various items of training data may be specified by a human user. In some implementations, ground-truth input engine 412 has an interface with OCR training engine 160, through which shared ground truth information 161 may be exchanged. For example, OCR training engine 160 may collect user input describing character centers, character boundaries (such as with bounding boxes) in a ROI specimen used for training of OCR engine 158 and, in turn, the character-boundary information may be passed to RP training engine 156 via the interface with OCR training engine 160.

Training need evaluation engine 414 is constructed, programmed, or otherwise configured, to perform status monitoring and evaluation operations that determine a need for additional training or other operational parameter updating for ROI preprocessing engine 154. Additional training or other updating may be needed, for example, in response to any changes in the appearance of the ROI layouts. For instance, training need evaluation engine 414 may evaluate captured images 153 or extracted ROI images 155 for any reduction of image contrast that may be attributable to fading or color changes of the ink used to print information in the ROI(s) 108, or changes in the ambient lighting, image-capturing equipment, background material color on which the information of interest is printed, or the like. These changes may affect the performance of ROI preprocessing engine 154 in detecting ROIs 108. The operations to evaluate any need for additional training of ROI preprocessing engine 154 may be performed periodically, in response to a triggering event or change in monitored conditions, or according to a combination thereof, according to various implementations.

Figure 5:
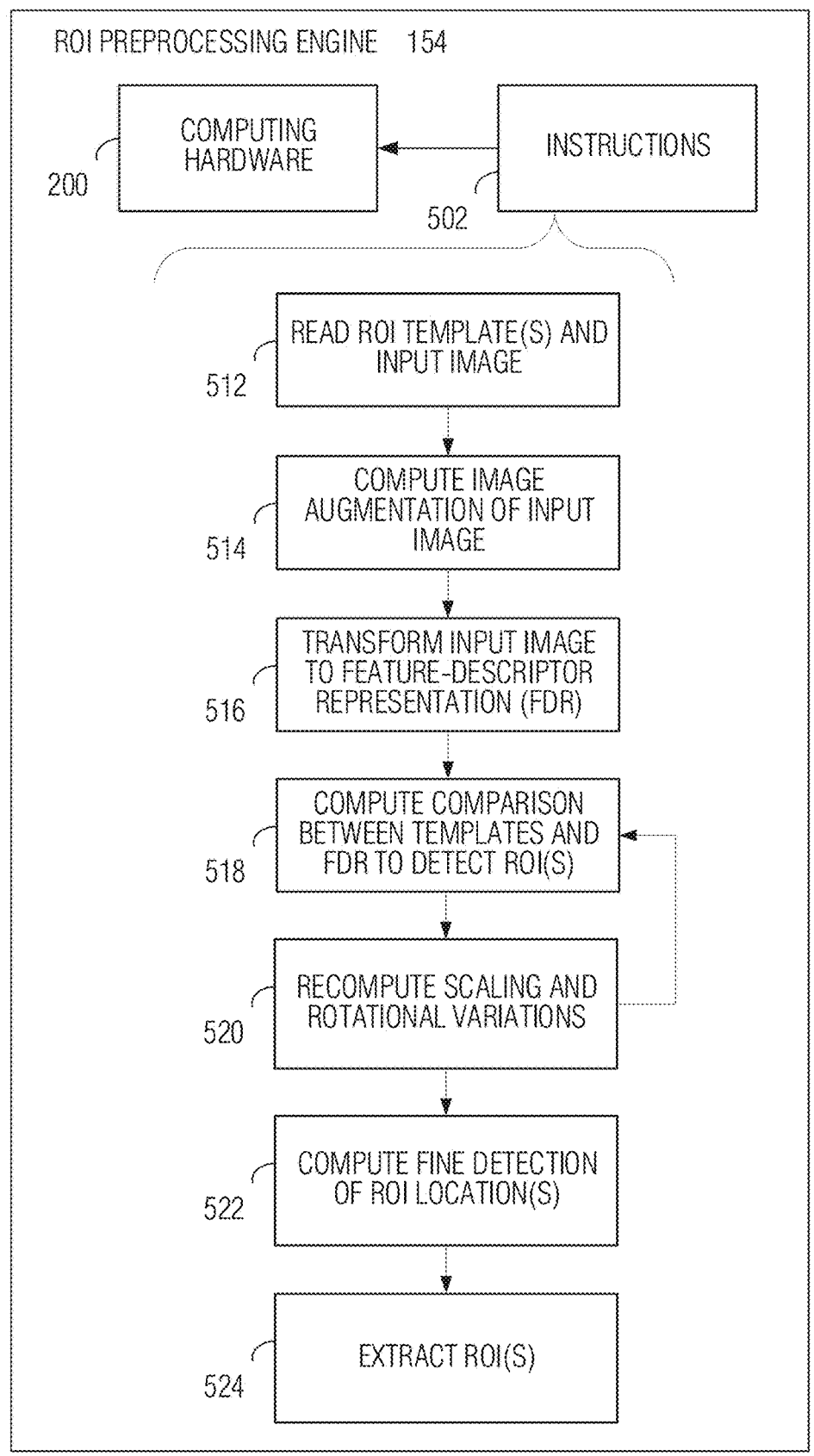
FIG. 5 is a structural diagram illustrating the ROI preprocessing engine of FIG. 3 according to an implementation.

FIG. 5 is a structural diagram illustrating ROI preprocessing engine 154 according to an implementation. As depicted, ROI preprocessing engine 154 includes computing hardware 200, and instructions 502 stored on one or more non-transitory storage media and executable by computing hardware 200 to implement ROI preprocessing engine 154 according to this example. Instructions 502, when executed, cause the computing hardware 200 to implement the following process, which may be performed with different orderings of operations unless certain operations are specifically called out as being performed in sequence. In some variations, certain operations may be modified or omitted.

At 512, RP process flow engine 320 reads current ROI templates 157 and captured image 153 from data store 310. The current ROI templates 157 may include rotated versions of individual one or more ROI templates (e.g., at ±15°, ±25°, ±40°). At 514, RP process flow engine 320 coordinates passing of input image 153 to image augmentation engine 302 for processing. As part of the image augmentation processing, image augmentation engine 302 may perform scaling, noise filtering, and duplication operations. For instance, the scaling operation may include downscaling of input image 153 by a defined factor, such as resampling at 25% of the original resolution. The noise filtering operation may include computation of a Gaussian blur function on input image 153. Duplication of input image 153 may be performed on noise-filtered and rescaled versions of image 153 at various resolutions (e.g., in ±10% steps to produce multiple, variously-sized variations of image 153, to be saved in data store 310 for further processing.

At 516, RP process flow engine 320 calls transformation engine 304 to perform one or more transform operations, such as a HOG transform, on the augmented image 153 and its variously-scaled versions, to create a FDR of each as a respective data structure. In some implementations, the resolution of the transform (e.g., spatial bin size) is configured to match the resolution of the transform operation used to create ROI template 157.

At 518, RP process flow engine 320 calls comparison engine 306 to perform one or more comparison operations comparing each ROI template 157 against the FDR of image 153. At 520, the comparison operation at 518 is repeated for each FDR of each scaling variation of image 153, and again for each rotational variation of each ROI template 157.

Figure 6:
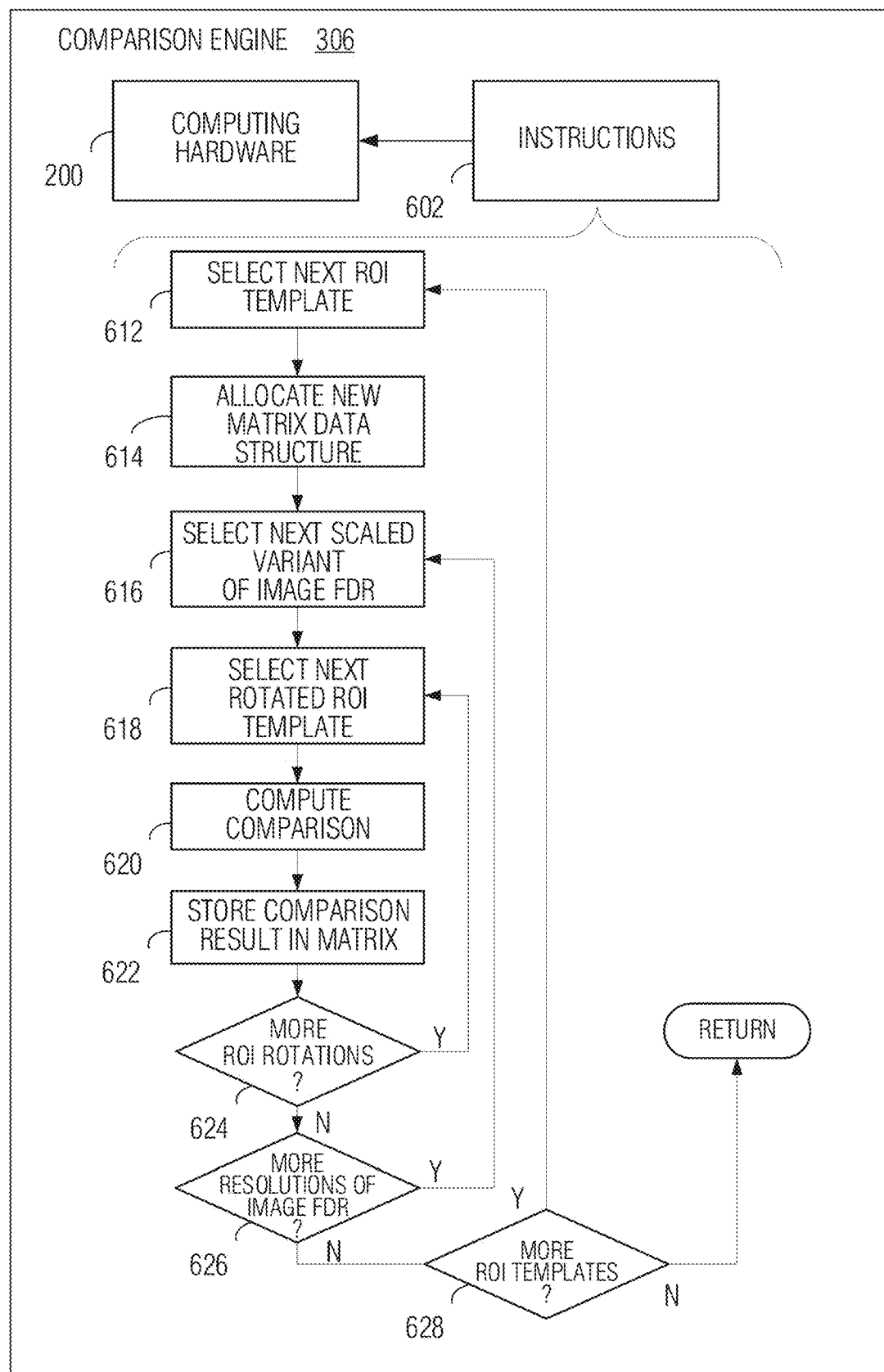
FIG. 6 is a structural diagram illustrating a comparison engine according to an example implementation for executing operations of the ROI preprocessing engine as described in connection with FIG. 5.

Turning briefly to FIG. 6, a structural diagram illustrating comparison engine 306 in greater detail, according to an implementation for executing operations 518-520, is shown. Comparison engine 306 includes computing hardware 200, and instructions 602 stored on one or more non-transitory storage media and executable by computing hardware 200 to implement comparison engine 306 according to this example. Instructions 602, when executed, cause the computing hardware 200 to implement the following process, which may be performed with different orderings of operations unless certain operations are specifically called out as being performed in sequence. In some variations, certain operations may be modified or omitted.

At 612, comparison engine 306 selects the next (or, in the case of the first iteration, the initial) ROI template for processing. At 614, comparison engine 306 allocates a new matrix data structure corresponding to the selected ROI template, in which the peak comparison score for each comparison pairing will be saved.

At 616, comparison engine 306 selects the next (or first) scaled variant of the image 153 FDR. At 618, comparison engine 306 selects the next (or first) rotated ROI template corresponding to the current ROI selected at 612. At 620, the comparison operation is performed. The comparison operation may be a sliding-window correlation (e.g., ZMNCC) operation, or another suitable computation. At 622, the peak value of the comparison operation is stored in an appropriate cell of a m×n matrix where each row from among the m rows corresponds to a scaling of input image 153 from which the FDR subject to the comparison operation was computed, and each column from among the n columns corresponds to a rotational angle at which the ROI template 157 was oriented for the comparison operation.

Decision 624 determines if additional rotated variants of the current ROI template are available. In the affirmative case, the process loops back to operation 618 to select the next ROI rotational angle with which to repeat the comparison operation and store the result at 620-622. Decision 626 checks if there are any additional scaled variants of the FDR of image 153 available. In the affirmative case, the process loops back to operation 616 to select the next scaled variant of the FDR of image 153 with which to repeat the comparison operation and store the result at 620-622. Decision 628 checks if any additional ROI templates are available. In the affirmative case, the next ROI template is selected at 612 and the process is iterated to produce a new comparison result set (e.g., to be saved as a new matrix data structure). Accordingly, a separate results matrix may be computed for each individual ROI template at its various rotational angles. For a positively-detected presence of a ROI, the corresponding results matrix will have a region of cells where the comparison result contains relatively higher values than other regions.

Figure 7:
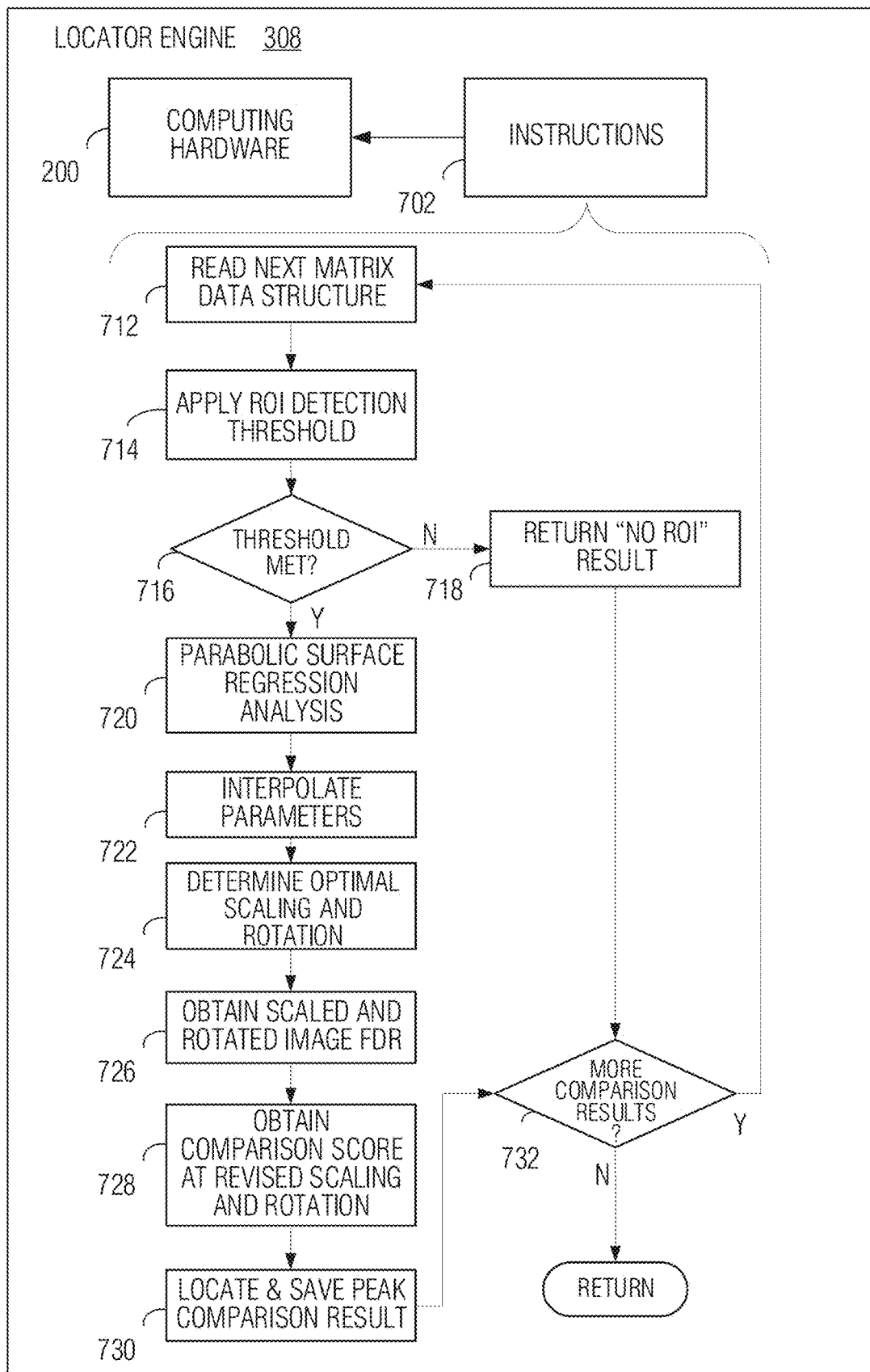
FIG. 7 is a structural diagram illustrating a locator engine according to an example implementation for executing operations of the ROI preprocessing engine as described in connection with FIG. 5.

Returning to FIG. 5, at 522, ROI preprocessing engine 154 computes a fine-grained detection of the location of each detected ROI. FIG. 7 is a structural diagram illustrating locator engine 308 in greater detail, according to an implementation for executing operation 522, is shown. Locator engine 308 includes computing hardware 200, and instructions 702 stored on one or more non-transitory storage media and executable by computing hardware 200 to implement locator engine 308 according to this example. Instructions 702, when executed, cause the computing hardware 200 to implement the following process, which may be performed with different orderings of operations unless certain operations are specifically called out as being performed in sequence. In some variations, certain operations may be modified or omitted.

At 712, locator engine 308 reads the next (or first) matrix data structure that is generated by comparison engine 306. At 714, a ROI detection threshold is applied. For instance, a high correlation score for the current ROI template 157 (e.g. a ZMNCC score of 0.5 or higher appearing in any cell of the matrix data structure of the comparison results) may be indicative of a positive detection of the presence of the current ROI 108 in image 153. If the detection threshold is not met at decision 716, a negative result indicating a non-detection of the ROI is returned at 718 and the process branches to decision 732 to check if any additional comparison results (i.e., additional matrix data structures) are available for analysis. In the affirmative case, the process advances to a next iteration at 712 with a new matrix data structure.

If the result of decision 716 is a meeting of the detection threshold, meaning that the presence of ROI 108 was detected, the process advances to operation 720 to perform a fine-grained locating. In an example technique as depicted, a parabolic-surface regression analysis is performed in which a parabolic (or other polynomial) function is fitted to the comparison scores in the matrix. The position of the apex of the parabola is informative of the optimal scaling and rotational angle for maximum detection sensitivity of the current ROI 108 in the current image 153. Notably, the apex of the parabola may fall between the scaling or rotational-angle steps. Accordingly, operation 722 computes an interpolation of the scaling and rotational parameters that correspond to the position of the apex of the fitted parabola. This technique is able to determine the indication of the image-augmentation and rotation parameters with sub-step resolution.

At 724, the optimal scaling and rotation values determined at operation 722 are passed to RP process flow engine 320, which in turn, calls image augmentation engine 302 for rescaling of image 153 to the optimal resolution and counter-rotating of image 153 according to the optimal rotational angle for improvement of the ROI detection sensitivity. RP process flow engine 320 may then call transformation engine 304 to compute the FDR of the optimally-scaled image 153. At 726, locator engine 308 obtains the FDR of rescaled and counter-rotated image 153.

RP process flow engine 320 may call comparison engine 306 to perform a comparison operation between the FDR of the optimally scaled and rotated image 153 and the non-rotated ROI template 157. In a related implementation, instead of counter-rotating image 153, the ROI template 157 may be rotated to the optimal angle prior to performing the comparison operation.

At 728, locator engine 308 obtains the comparison results mapped to the FDR of image 153. At 730, locator engine 308 locates the peak comparison score in the comparison results. The location of the peak comparison score corresponds to the location of the center of the ROI in image 153. This location is passed to RP process flow engine 320, and the process advances to decision 732 to check if any other comparison results are available for analysis, so that the process may be either further iterated, or ended.

Returning again to FIG. 5, at 524, ROI extraction engine 312 is passed the determined location(s) of the center(s) of ROI(s) 108 in image 153. Using this information, along with information describing the boundary of each respective ROI 108 and its angle of rotation as determined by locator engine 308, image 153 is cropped around each ROI boundary to produce image files of each ROI. In an example implementation, a defined cropping margin around each ROI is added to capture any potential ROI content falling outside of the previously-determined ROI boundary. The output of these operations is the set of extracted ROI images 155.

Figure 8:
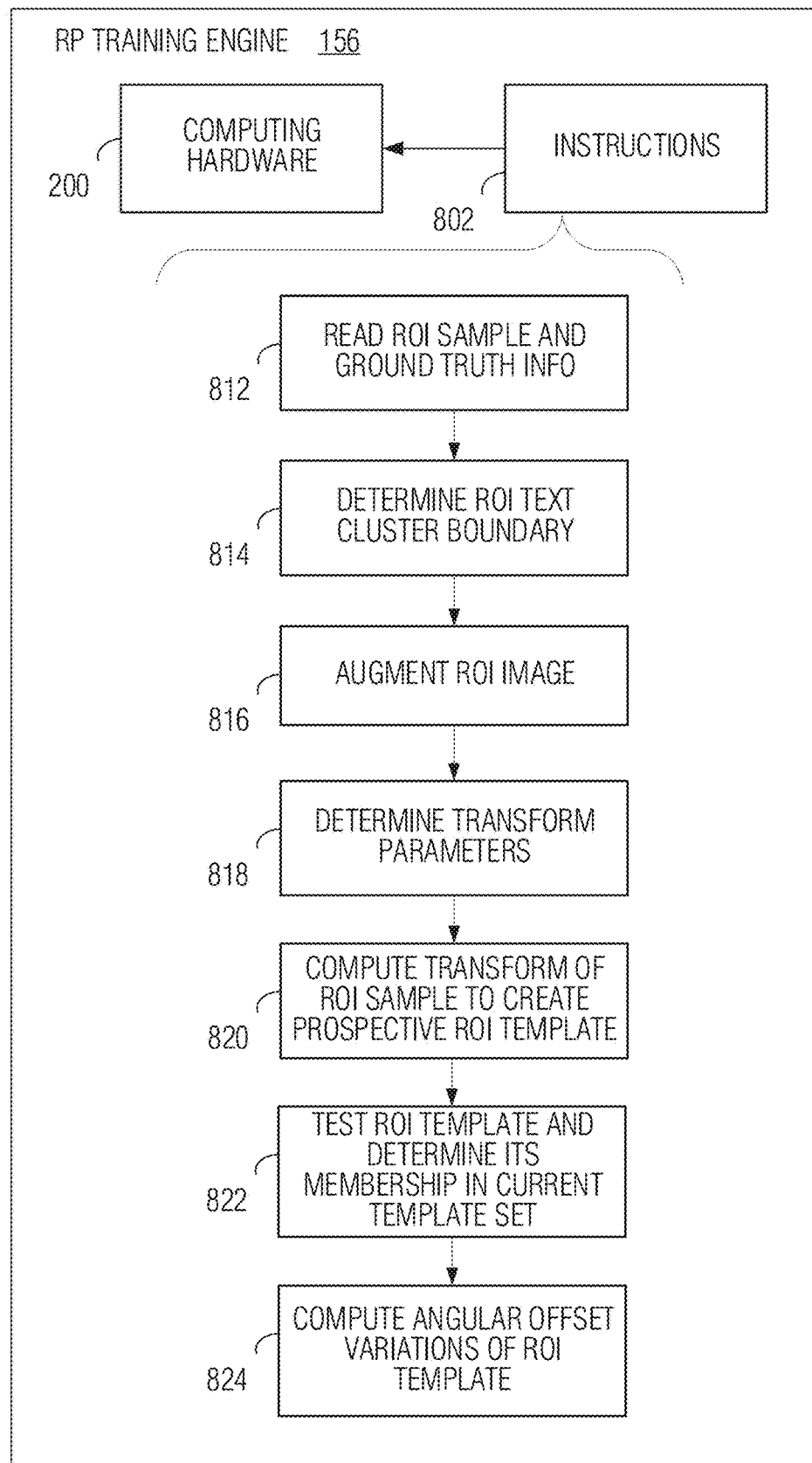
FIG. 8 is a structural diagram illustrating the RP training engine of FIG. 4 according to an example implementation.

FIG. 8 is a structural diagram illustrating RP training engine 156 according to an implementation. As depicted, RP training engine 156 includes computing hardware 200, and instructions 802 stored on one or more non-transitory storage media and executable by computing hardware 200 to implement RP training engine 156 according to this example. Instructions 802, when executed, cause the computing hardware 200 to implement the following process, which may be performed with different orderings of operations unless certain operations are specifically called out as being performed in sequence. In some variations, certain operations may be modified or omitted.

At 812, training process flow engine 420 reads a ROI sample and corresponding ground truth information. The ROI sample and ground truth information may be obtained via ground-truth input engine 412. The ROI sample may be in the form of a captured image, graphical representation (e.g., bitmap, vector-graphic), text (e.g., rich-text format, html), or other suitable representation of a ROI. The ground truth information may include information about character size, character centers, character boundaries (e.g., represented by character-level bounding boxes), ROI boundaries (e.g., represented by ROI-level bounding box or boxes), or the like.

At 814, ground-truth input engine 412 determines the boundary of the ROI text cluster. In some implementations, this determination may be as simple as extracting a specified indication of the ROI-level boundary from among the ground truth information that has been provided along with the ROI sample. In other implementations, the ROI boundary is determined algorithmically based on other provided ground truth information such as from the character-level boundary indicators. In an example of the latter case, the ROI text boundary may be inferred by first identifying an approximate center of the text cluster, or cluster of symbols of the ROI, and selecting the outer-most edges of the character bounding boxes. In one example, the ROI text boundary may be defined as a set of interconnected line segments that includes the outer-bounding-box boundaries of symbols, and added segments that connect adjacent ones of those outer-bounding-box boundaries. In another example, the ROI text boundary is a rectangle having sides placed at the most distant ones of the character outer-bounding-box boundaries.

At 816, training process flow engine 420 calls image augmentation engine 302 to process the ROI image in advance of transformation of the ROI image to a FDR. In implementations where the ROI is represented as formatted text, the ROI may first be converted to a suitable image representation. The ROI image may be augmented by cropping it around the determined ROI boundary, noise filtering, blurring, downsampling, or other suitable image-processing operation. The augmented ROI image is passed to transformation engine 304 for further processing.

At 818, transformation engine 304 determines the transform parameters to be used to perform the transform of the augmented ROI image to a FDR representation thereof. One of the transform parameters may be the spatial bin size for a HOG transform according to an example. The spatial bin size may be set based on the size of the ROI, the average character size, or some combination thereof. In one implementation, if there are multiple ROIs to be transformed, all of the ROIs are processed to determine a common spatial bin size to be used for their respective transforms. For instance, the smallest determined spatial bin size from among the ROIs may be selected to be used as the common spatial bin size.

At 820, transformation engine 304 is used to transform the one or more augmented ROI images to their respective FDRs. A HOG transform with the spatial bin size determined at operation 818 may be computed by transformation engine 304 for each augmented ROI. The result of each respective transformation is a prospective ROI template.

At 822, training process flow engine calls template qualifier engine 408 to test the ROI-detection performance of each newly-created prospective ROI template in order to determine whether to add that ROI template to the current set of ROI templates 157 to be used for ROI detection. As discussed above, template qualifier engine 408 may test each of the current set of ROI templates 157 on a test image containing one or more ROIs 108 and collects corresponding comparison scores for each ROI template 157 of the current set.

Testing may be performed by calling for certain operations of ROI preprocessing engine 154, such as performing the comparison operations as discussed above. Each newly-created ROI template 157 is likewise tested on the same test image and the resulting comparison score may be compared to the comparison score achieved from the current set of ROI templates. Qualification criteria may be applied to determine if the ROI detection and discrimination performance of each prospective ROI template is better than the performance of the current set of ROI templates and, if so, whether the prospective ROI template performs better by a sufficient margin to warrant adding the prospective ROI template to the current set of ROI templates 157 as an additional ROI template or in place of a current ROI template.

In a related example, if more than one ROI template 157 is intended for use to detect an individual ROI, the ROI templates 157 corresponding to that ROI may be ranked in order of detection sensitivity. Detection sensitivity may be determined during testing of the ROI templates 157 on multiple different training images. An average sensitivity score may be determined for each of the ROI templates 157 over the set of training images. The most sensitive ROI template may be preferentially used first for detection of the presence of the ROI in a given application.

At 824, for each ROI template to be added to the current set of ROI templates 157, a set of angular offset variations is generated using image augmentation engine 302, and each variant is stored in data store 310.

Returning to FIG. 1B, OCR engine 168 according to various implementations may use any suitable OCR technique. As an example, an image processor system such as one described in U.S. Pat. No. 9,396,404, incorporated by reference herein, may be employed.

Figure 9:
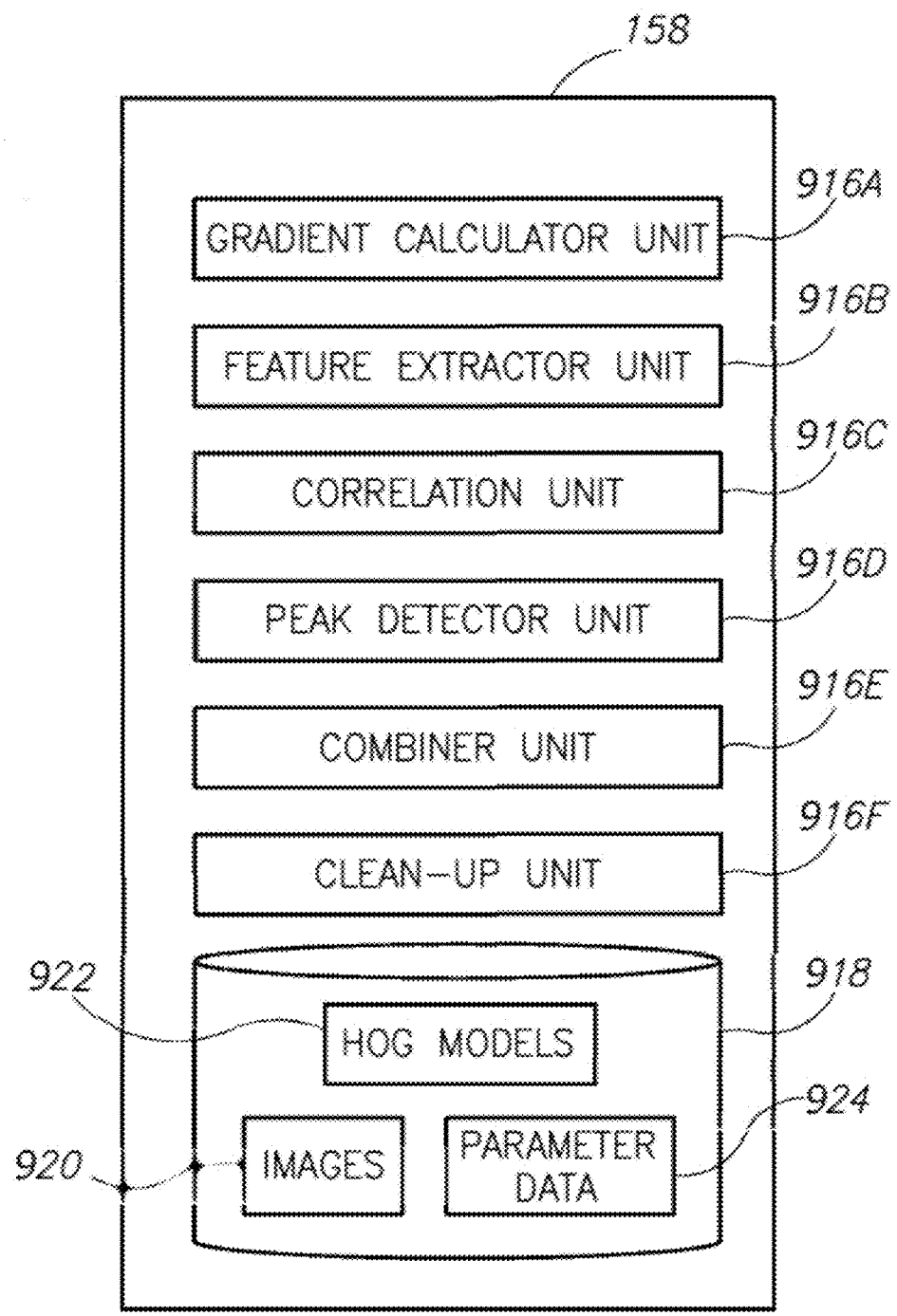
FIG. 9 is a block diagram illustrating an example implementation of OCR engine of the image processing system depicted in FIGS. 1A and 1B.

FIG. 9 is a block diagram illustrating an example implementation of OCR engine 158. OCR engine 158 includes a number of engines 916 that may be used to perform the OCR functionality. Each of these engines 916 may be implemented as separate or combined sub-processes or applications executing on the hardware of OCR engine 158, which may be computing hardware 200 or a separate computing system. In some implementations, fewer or more engines 916 may be provided. In the illustrated example, OCR engine 158 includes a gradient calculator engine 116A, a feature extractor engine 116B, a correlation engine 116C, a peak detector engine 116D, a combiner engine 116E, and a clean-up engine 116F. Each of these engines 916 is discussed in detail in U.S. Pat. No. 9,396,404. OCR engine 158 also includes a data store 918 which may store image data 920, HOG models 922, parameter data 924, or other data utilized in the OCR processes. The data store 918 may be incorporated as part of data store 310 discussed above, or it may be implemented distinctly.

Figure 10A:
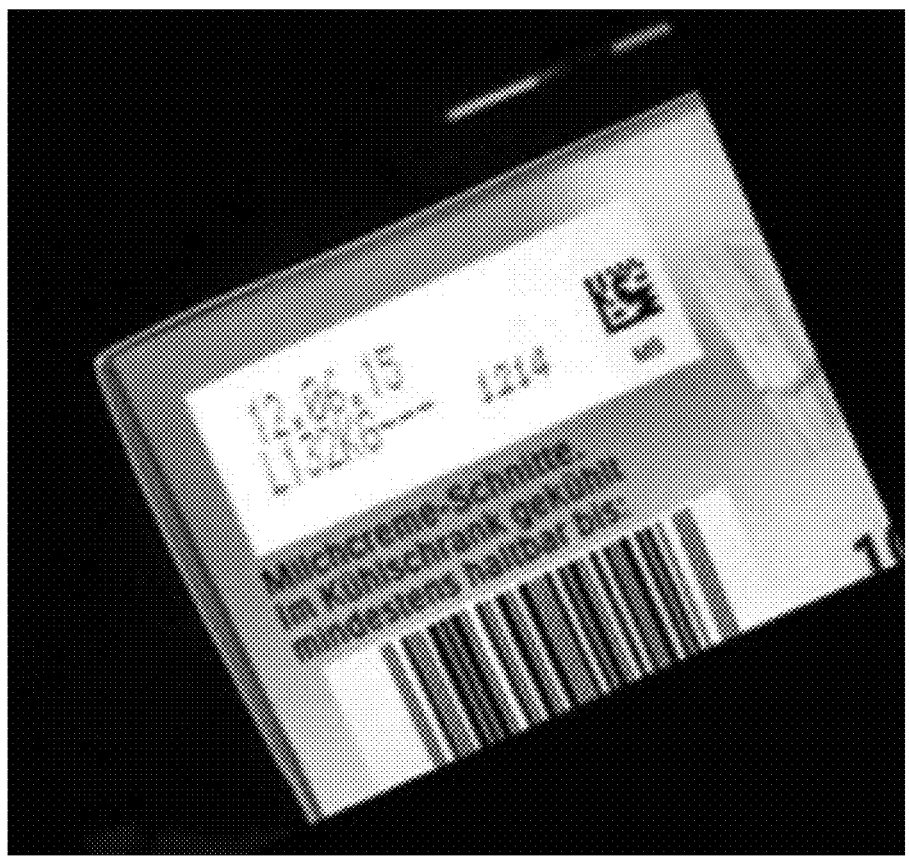
FIGS. 10A-10C are images illustrating an example of the operation of a trained ROI preprocessing engine according to an implementation.
Figure 10B:
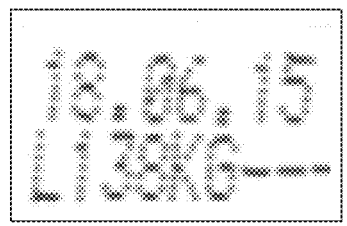
Figure 10C:
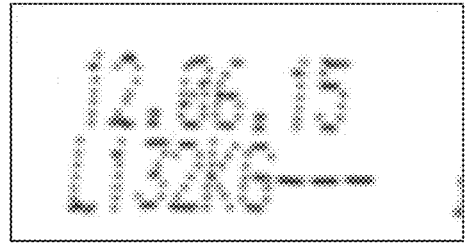

FIGS. 10A-10C are images illustrating an example of the operation of trained ROI preprocessing engine 154 according to an implementation. FIG. 10A shows an example of a captured image that includes a ROI and various non-ROI features including non-ROI text and barcodes. The captured image of FIG. 10A is used as the input to ROI preprocessing engine 154. FIG. 10B is an image of an example ROI from which a ROI template was created. Notably, the example ROI on which the ROI template is based has a similar layout (relative character positioning, typeface, relative character size, punctuation) as the ROI present in the captured image, but different characters in some positions. FIG. 10C is an image of the ROI as extracted from the captured image of FIG. 10A by ROI preprocessing engine 154. Notably, all of the non-ROI content of the image of FIG. 10A is substantially omitted from the extracted ROI image of FIG. 10C. The term "substantially omitted" in this context means that an OCR operation taking the extracted image of FIG. 10C as its input would not recognize any non-ROI characters or symbols.

ADDITIONAL NOTES AND EXAMPLES

Example 1 is an image processing system comprising: an input coupled, configured, or otherwise operative, to receive a captured image that contains: (a) a region of interest (ROI) including a plurality of characters to be autonomously recognized as text and included in an output of an optical character recognition (OCR) system, and (b) non-ROI content to be excluded from the OCR system output; a region of interest (ROI) preprocessing engine operatively coupled to the input to perform autonomous processing of the captured image and configured, or otherwise operative, to detect and locate the ROI in the captured image, and to determine a boundary of the ROI, wherein the autonomous processing includes: a transformation of the captured image to a first feature descriptor representation (FDR) of the captured image; and comparison between the first FDR and at least one ROI template that includes, at least a second FDR of a representative ROI image; wherein the autonomous processing produces an output to be provided to an OCR engine that is coupled, configured, or otherwise operative, to perform autonomous OCR processing of the ROI while ignoring the non-ROI content based on the determined boundary of the ROI.

In Example 2, the subject matter of Example 1 includes, the OCR engine.

In Example 3, the subject matter of Examples 1-2 includes, wherein the non-ROI content includes text.

In Example 4, the subject matter of Examples 1-3 includes, wherein the autonomous processing further includes rescaling of the captured image prior to the transformation.

In Example 5, the subject matter of Example 4 includes, wherein the rescaling of the captured image includes duplication and rescaling of the captured image according to a plurality of different image resolutions.

In Example 6, the subject matter of Examples 1-5 includes, wherein the autonomous processing further includes blurring of the captured image prior to the transformation.

In Example 7, the subject matter of Examples 1-6 includes, wherein the transformation of the captured image includes a histogram of oriented gradients (HOG) transform.

In Example 8, the subject matter of Examples 1-7 includes, wherein the comparison includes a sliding-window comparison computation.

In Example 9, the subject matter of Example 8 includes, wherein the sliding-window comparison computation includes a zero-mean normalized cross-correlation (ZMNCC) computation.

In Example 10, the subject matter of Examples 1-9 includes, wherein the ROI preprocessing engine is coupled, configured, or otherwise operative, to further crop the captured image around the boundary of the ROI to extract the ROI.

In Example 11, the subject matter of Examples 1-10 includes, wherein the at least one ROI template includes a plurality of rotated variants of the second FDR.

In Example 12, the subject matter of Examples 1-11 includes, wherein the at least one ROI template includes a plurality ROI templates respectively corresponding to a plurality of different representative ROI images.

In Example 13, the subject matter of Examples 1-12 includes, wherein the autonomous processing includes a plurality of comparisons between multiple FDRs of respective multiple differently-scaled variants of the captured image and the at least one ROI template, to produce a corresponding plurality of comparison results.

In Example 14, the subject matter of Example 13 includes, wherein the plurality of comparison results are stored in a multi-dimensional data structure wherein comparison results represented along a first dimension correspond to comparisons using the multiple differently-scaled variants of the captured image, and wherein comparison results represented along a second dimension correspond to comparisons using multiple rotated variants of an angular alignment between each of the multiple FDRs of the multiple differently-scaled variants of the captured image and the second FDR.

In Example 15, the subject matter of Example 14 includes, wherein the autonomous processing includes fitting a polynomial function to the plurality of comparison results as stored in the multi-dimensional data structure, and locating an apex of the fitted polynomial function, wherein the apex coincides with an optimal scaling and optimal rotation between each of the multiple FDRs of the multiple differently-scaled variants of the captured image and the second FDR.

In Example 16, the subject matter of Example 15 includes, wherein the autonomous processing further includes performing an adjusted comparison between an optimized FDR of the captured image and the at least one ROI template, wherein the optimized FDR is based on the captured image at the optimal scaling and optimal rotation, wherein an output of the adjusted comparison is indicative of a location of the ROI in the captured image.

In Example 17, the subject matter of Examples 1-16 includes, a training engine operatively coupled to the ROI preprocessing engine to generate and provide the at least one ROI template for use by the ROI preprocessing engine.

In Example 18, the subject matter of Examples 1-17 includes, wherein the training engine is to further autonomously determine a need for generation of an additional ROI template.

Example 19 is a machine-implemented method for processing images, the method comprising: receiving a captured image that contains: (a) a region of interest (ROI) including a plurality of characters to be autonomously recognized as text and included in an output of an optical character recognition (OCR) system, and (b) non-ROI content to be excluded from the OCR system output; autonomously processing the captured image to detect and locate the ROI in the captured image, and to determine a boundary of the ROI, wherein the processing includes: performing a transformation of the captured image to a first feature descriptor representation (FDR) of the captured image; and performing comparison between the first FDR and at least one ROI template that includes, at least a second FDR of a representative ROI image; wherein the processing produces an output to be provided to an OCR engine to perform autonomous OCR processing of the ROI while ignoring the non-ROI content based on the determined boundary of the ROI.

In Example 20, the subject matter of Example 19 includes, wherein the non-ROI content includes text.

In Example 21, the subject matter of Examples 19-20 includes, wherein the processing further includes rescaling of the captured image prior to the transformation.

In Example 22, the subject matter of Example 21 includes, wherein the rescaling of the captured image includes duplication and rescaling of the captured image according to a plurality of different image resolutions.

In Example 23, the subject matter of Examples 19-22 includes, wherein the processing further includes blurring of the captured image prior to the transformation.

In Example 24, the subject matter of Examples 19-23 includes, wherein the transformation of the captured image includes a histogram of oriented gradients (HOG) transform.

In Example 25, the subject matter of Examples 19-24 includes, wherein the comparison includes a sliding-window comparison computation.

In Example 26, the subject matter of Example 25 includes, wherein the sliding-window comparison computation includes a cross-correlation computation.

In Example 27, the subject matter of Examples 19-26 includes, wherein the processing further includes cropping the captured image around the boundary of the ROI to extract the ROI.

In Example 28, the subject matter of Examples 19-27 includes, wherein the at least one ROI template includes a plurality of rotated variants of the second FDR.

In Example 29, the subject matter of Examples 19-28 includes, wherein the at least one ROI template includes a plurality ROI templates respectively corresponding to a plurality of different representative ROI images.

In Example 30, the subject matter of Examples 19-29 includes, wherein the processing includes performing a plurality of comparisons between multiple FDRs of respective multiple differently-scaled variants of the captured image and the at least one ROI template, to produce a corresponding plurality of comparison results.

In Example 31, the subject matter of Example 30 includes, wherein the plurality of comparison results are stored in a multi-dimensional data structure wherein comparison results represented along a first dimension correspond to comparisons using the multiple differently-scaled variants of the captured image, and wherein comparison results represented along a second dimension correspond to comparisons using multiple rotated variants of an angular alignment between each of the multiple FDRs of the multiple differently-scaled variants of the captured image and the second FDR.

In Example 32, the subject matter of Example 31 includes, wherein the processing includes fitting a polynomial function to the plurality of comparison results as stored in the multi-dimensional data structure, and locating an apex of the fitted polynomial function, wherein the apex coincides with an optimal scaling and optimal rotation between each of the multiple FDRs of the multiple differently-scaled variants of the captured image and the second FDR.

In Example 33, the subject matter of Example 32 includes, wherein the processing further includes performing an adjusted comparison between an optimized FDR of the captured image and the at least one ROI template, wherein the optimized FDR is based on the captured image at the optimal scaling and optimal rotation, wherein an output of the adjusted comparison is indicative of a location of the ROI in the captured image.

In Example 34, the subject matter of Examples 19-33 includes, generating the at least one ROI template for use by the ROI preprocessing engine.

In Example 35, the subject matter of Examples 19-34 includes, autonomously determining a need for generation of an additional ROI template.

Example 36 is at least one non-transitory machine-readable medium containing instructions for processing images, wherein the instructions when executed on a computing system, cause the computing system coupled, configured, or otherwise operative, to : receive a captured image that contains: (a) a region of interest (ROI) including a plurality of characters to be autonomously recognized as text and included in an output of an optical character recognition (OCR) system, and (b) non-ROI content to be excluded from the OCR system output; perform autonomously processing of the captured image to detect and locate the ROI in the captured image, and to determine a boundary of the ROI, wherein the processing includes: performing a transformation of the captured image to a first feature descriptor representation (FDR) of the captured image; and performing comparison between the first FDR and at least one ROI template that includes, at least a second FDR of a representative ROI image; wherein the processing produces an output to be provided to an OCR engine to perform autonomous OCR processing of the ROI while ignoring the non-ROI content based on the determined boundary of the ROI.

In Example 37, the subject matter of Example 36 includes, wherein the non-ROI content includes text.

In Example 38, the subject matter of Examples 36-37 includes, wherein the processing further includes rescaling of the captured image prior to the transformation.

In Example 39, the subject matter of Example 38 includes, wherein the rescaling of the captured image includes duplication and rescaling of the captured image according to a plurality of different image resolutions.

In Example 40, the subject matter of Examples 36-39 includes, wherein the processing further includes blurring of the captured image prior to the transformation.

In Example 41, the subject matter of Examples 36-40 includes, wherein the transformation of the captured image includes a histogram of oriented gradients (HOG) transform.

In Example 42, the subject matter of Examples 36-41 includes, wherein the comparison includes a sliding-window comparison computation.

In Example 43, the subject matter of Example 42 includes, wherein the sliding-window comparison computation includes a cross-correlation computation.

In Example 44, the subject matter of Examples 36-43 includes, wherein the processing further includes cropping the captured image around the boundary of the ROI to extract the ROI.

In Example 45, the subject matter of Examples 36-44 includes, wherein the at least one ROI template includes a plurality of rotated variants of the second FDR.

In Example 46, the subject matter of Examples 36-45 includes, wherein the at least one ROI template includes a plurality ROI templates respectively corresponding to a plurality of different representative ROI images.

In Example 47, the subject matter of Examples 36-46 includes, wherein the processing includes performing a plurality of comparisons between multiple FDRs of respective multiple differently-scaled variants of the captured image and the at least one ROI template, to produce a corresponding plurality of comparison results.

In Example 48, the subject matter of Example 47 includes, wherein the plurality of comparison results are stored in a multi-dimensional data structure wherein comparison results represented along a first dimension correspond to comparisons using the multiple differently-scaled variants of the captured image, and wherein comparison results represented along a second dimension correspond to comparisons using multiple rotated variants of an angular alignment between each of the multiple FDRs of the multiple differently-scaled variants of the captured image and the second FDR.

In Example 49, the subject matter of Example 48 includes, wherein the processing includes fitting a polynomial function to the plurality of comparison results as stored in the multi-dimensional data structure, and locating an apex of the fitted polynomial function, wherein the apex coincides with an optimal scaling and optimal rotation between each of the multiple FDRs of the multiple differently-scaled variants of the captured image and the second FDR.

In Example 50, the subject matter of Example 49 includes, wherein the processing further includes performing an adjusted comparison between an optimized FDR of the captured image and the at least one ROI template, wherein the optimized FDR is based on the captured image at the optimal scaling and optimal rotation, wherein an output of the adjusted comparison is indicative of a location of the ROI in the captured image.

In Example 51, the subject matter of Examples 36-50 includes, wherein the processing further includes generating the at least one ROI template for use by the ROI preprocessing engine.

In Example 52, the subject matter of Examples 36-51 includes, wherein the processing further includes autonomously determining a need for generation of an additional ROI template.

Example 53 is at least one machine-readable medium including instructions that, when executed by processing circuitry, cause the processing circuitry to perform operations to implement of any of Examples 1-52.

Example 54 is an apparatus comprising means to implement of any of Examples 1-52.

Example 55 is a system to implement of any of Examples 1-52.

Example 56 is a method to implement of any of Examples 1-52.

While the disclosure is susceptible to various modifications and alternative forms, specific embodiments have been shown by way of example in the drawings and have been described in detail herein. However, the disclosure is not limited to the particular forms disclosed. Rather, the disclosure is to cover all modifications, equivalents, and alternatives falling within the scope of the following appended claims and their legal equivalents.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as will be understood by persons of ordinary skill in the art.

Any incorporation by reference of documents above is limited such that no subject matter is incorporated that is contrary to the explicit disclosure herein. Any incorporation by reference of documents above is further limited such that no claims that are included in the documents are incorporated by reference into the claims of the present Application. The claims of any of the documents are, however, incorporated as part of the disclosure herein, unless specifically excluded. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:
1. An image processing system comprising:
an input configured to receive a captured image that contains: (a) a region of interest (ROI) including a plurality of characters to be autonomously recognized as text and included in an output of an optical character recognition (OCR) system, and (b) non-ROI content to be excluded from the OCR system output; and
a region of interest (ROI) preprocessing engine operatively coupled to the input to perform autonomous processing of the captured image, and configured to detect and locate the ROI in the captured image, and to determine a boundary of the ROI, wherein the autonomous processing includes:
a transformation of the captured image to a first feature descriptor representation (FDR) of the captured image; and
comparison between the first FDR and at least one ROI template that includes at least a second FDR of a representative ROI image;

wherein the autonomous processing produces an output to be provided to an OCR engine to perform autonomous OCR processing of the ROI while ignoring the non-ROI content based on the determined boundary of the ROI, wherein the autonomous processing includes a plurality of comparisons between multiple FDRs of respective multiple differently-scaled variants of the captured image and the at least one ROI template, and configured to produce a corresponding plurality of comparison results stored in a multi-dimensional data structure, wherein the comparison results are represented along a first dimension correspond to comparisons using the multiple differently-scaled variants of the captured image, and wherein the comparison results are represented along a second dimension correspond to comparisons using multiple rotated variants of an angular alignment between each of the multiple FDRs of the multiple differently-scaled variants of the captured image and the second FDR.

2. The image processing system of claim 1, wherein the autonomous processing further includes rescaling of the captured image prior to the transformation.

3. The image processing system of claim 1, wherein the transformation of the captured image includes a histogram of oriented gradients (HOG) transform.

4. The image processing system of claim 1, wherein the comparison includes a sliding-window comparison computation.

5. The image processing system of claim 1, wherein the ROI preprocessing engine is further configured to crop the captured image around the boundary of the ROI to extract the ROI.

6. The image processing system of claim 1, wherein the at least one ROI template includes a plurality of rotated variants of the second FDR.

7. The image processing system of claim 1, wherein the at least one ROI template includes a plurality ROI templates respectively corresponding to a plurality of different representative ROI images.

8. The image processing system of claim 1, wherein the autonomous processing includes fitting a polynomial function to the plurality of comparison results as stored in the multi-dimensional data structure, and locating an apex of the fitted polynomial function, wherein the apex coincides with an optimal scaling and optimal rotation between each of the multiple FDRs of the multiple differently-scaled variants of the captured image and the second FDR.

9. The image processing system of claim 8, wherein the autonomous processing further includes performing an adjusted comparison between an optimized FDR of the captured image and the at least one ROI template, wherein the optimized FDR is based on the captured image at the optimal scaling and optimal rotation, and wherein an output of the adjusted comparison is indicative of a location of the ROI in the captured image.

10. The image processing system of claim 1, further comprising:
a training engine operatively coupled to the ROI preprocessing engine, and configured to generate and provide the at least one ROI template for use by the ROI preprocessing engine.

11. The image processing system of claim 1, wherein the training engine is further configured to autonomously determine a need for generation of an additional ROI template.

12. The image processing system of claim 1, wherein the output includes an extracted ROI image in a format of at least one of a separate file or a data structure.

13. The image processing system of claim 1, wherein the ROI preprocessing engine includes machine-learning functionality configured to adapt to changing conditions and characteristics of the text of interest.

14. A machine-implemented method for processing images, the method comprising:
receiving a captured image that contains: (a) a region of interest (ROI) including a plurality of characters to be autonomously recognized as text and included in an output of an optical character recognition (OCR) system, and (b) non-ROI content to be excluded from the OCR system output;
autonomously processing the captured image to detect and locate the ROI in the captured image, and to determine a boundary of the ROI, wherein the processing includes:
performing a transformation of the captured image to a first feature descriptor representation (FDR) of the captured image; and
performing comparison between the first FDR and at least one ROI template that includes at least a second FDR of a representative ROI image;
wherein the processing produces an output to be provided to an OCR engine to perform autonomous OCR processing of the ROI while ignoring the non-ROI content based on the determined boundary of the ROI, wherein the processing includes performing a plurality of comparisons between multiple FDRs of respective multiple differently-scaled variants of the captured image and the at least one ROI template, to produce a corresponding plurality of comparison results, wherein the plurality of comparison results are stored in a multi-dimensional data structure wherein comparison results represented along a first dimension correspond to comparisons using the multiple differently-scaled variants of the captured image, and wherein comparison results represented along a second dimension correspond to comparisons using multiple rotated variants of an angular alignment between each of the multiple FDRs of the multiple differently-scaled variants of the captured image and the second FDR.

15. The method of claim 14, wherein the at least one ROI template includes a plurality ROI templates respectively corresponding to a plurality of different representative ROI images.

16. The method of claim 14, wherein the processing includes performing a plurality of comparisons between multiple FDRs of respective multiple differently-scaled variants of the captured image and the at least one ROI template, to produce a corresponding plurality of comparison results.

17. The method of claim 16, wherein the processing includes fitting a polynomial function to the plurality of comparison results as stored in the multi-dimensional data structure, and further includes:
locating an apex of the fitted polynomial function, wherein the apex coincides with an optimal scaling and optimal rotation between each of the multiple FDRs of the multiple differently-scaled variants of the captured image and the second FDR; and
performing an adjusted comparison between an optimized FDR of the captured image and the at least one ROI template, wherein the optimized FDR is based on the captured image at the optimal scaling and optimal rotation, wherein an output of the adjusted comparison is indicative of a location of the ROI in the captured image.

18. The method of claim 14, further comprising:
generating the at least one ROI template for use by the ROI preprocessing engine.

19. At least one non-transitory machine-readable medium containing instructions for processing images, wherein the instructions when executed on a computing system, cause the computing system to:
receive a captured image that contains: (a) a region of interest (ROI) including a plurality of characters to be autonomously recognized as text and included in an output of an optical character recognition (OCR) system, and (b) non-ROI content to be excluded from the OCR system output;
perform autonomously processing of the captured image to detect and locate the ROI in the captured image, and to determine a boundary of the ROI, wherein the processing includes:
performing a transformation of the captured image to a first feature descriptor representation (FDR) of the captured image; and
performing comparison between the first FDR and at least one ROI template that includes at least a second FDR of a representative ROI image to produce a corresponding plurality of comparison results stored in a data structure, at least some of the stored comparison results corresponding to comparisons using multiple differently-scaled variants of the captured image or the at least one ROI template, and at least some of the stored comparison results corresponding to comparisons using multiple rotated variants of an angular alignment between the captured image and the at least one ROI image;
producing an output to be provided to an OCR engine to perform autonomous OCR processing of the ROI while ignoring the non-ROI content based on the determined boundary of the ROI.

20. The non-transitory machine-readable of claim 19, wherein the rotation and scaling variations between the captured image and the at least one ROI template for the comparison are based on multiple differently-scaled variants of the at least one ROI template being used for the comparison with the captured image.

* * * * *